United States Patent
Menon

(10) Patent No.: US 10,841,196 B2
(45) Date of Patent: Nov. 17, 2020

(54) KEY PERFORMANCE INDICATORS (KPI) FOR TRACKING AND CORRECTING PROBLEMS FOR A NETWORK-UNDER-TEST

(71) Applicant: Spirent Communications, Inc., San Jose, CA (US)

(72) Inventor: Jyotikumar U. Menon, Clarksburg, MD (US)

(73) Assignee: Spirent Communications, Inc., San Jose, CA (US)

(*) Notice: Subject to any disclaimer, the term of this patent is extended or adjusted under 35 U.S.C. 154(b) by 0 days.

(21) Appl. No.: 15/936,346

(22) Filed: Mar. 26, 2018

(65) Prior Publication Data
US 2019/0296997 A1    Sep. 26, 2019

(51) Int. Cl.
*H04L 12/26* (2006.01)
*H04L 29/06* (2006.01)

(52) U.S. Cl.
CPC ............ *H04L 43/50* (2013.01); *H04L 43/087* (2013.01); *H04L 43/0829* (2013.01);
(Continued)

(58) Field of Classification Search
CPC ............... H04L 43/087; H04L 43/0864; H04L 43/0829; H04L 43/50; H04L 43/16; H04L 69/16
(Continued)

(56) References Cited

U.S. PATENT DOCUMENTS 8,711,708 B2    4/2014  Wallman
9,485,165 B2    11/2016  Allan et al.
(Continued)

FOREIGN PATENT DOCUMENTS

CN    106534230 A    3/2017
EP    3099016 A1    11/2016

OTHER PUBLICATIONS

Cisco, Cisco ONS 15454 Procedure Guide Release 5.0 , 2005, Chapter 20, pp. 20-94 (Year: 2005).*
(Continued)

*Primary Examiner* — Tonia L Dollinger
*Assistant Examiner* — Schquita D Goodwin
(74) *Attorney, Agent, or Firm* — Haynes Beffel & Wolfeld, LLP; Ernest J. Beffel, Jr.

(57) ABSTRACT

The disclosed technology teaches testing a mesh network using new service application level KPIs that extend the TWAMP measurement architecture. A control-client receives and parses a configuration file to populate memory with IP addresses, ports, and test session parameters for disclosed KPIs used to originate two-way test sessions from a first network host; with control-servers and session-reflectors. The method extends the receiving, parsing and originating to dozens to thousands of control-clients, by sending to the control-clients configuration files to originate respective test sessions with control-servers in a mesh network using respective test session parameters; and while the test is running, sending an updated configuration file to at least one control-client that introduces a new control-server or replaces a control-server; and expanding the test to include the new or replacement control-server without stopping or restarting TW test sessions with other control-servers; and monitoring the running test sessions and receiving results.

21 Claims, 14 Drawing Sheets

(52) U.S. Cl.
CPC .......... *H04L 43/0864* (2013.01); *H04L 43/16* (2013.01); *H04L 69/16* (2013.01)

(58) Field of Classification Search
USPC ........................................................ 709/224
See application file for complete search history.

(56) References Cited

U.S. PATENT DOCUMENTS

| | | | |
|---|---|---|---|
| 9,503,344 | B2 | 11/2016 | Chakrabarti et al. |
| 9,531,621 | B2 | 12/2016 | Kolhi et al. |
| 9,654,370 | B2 | 5/2017 | Welin et al. |
| 9,705,769 | B1* | 7/2017 | Sarangapani .......... H04L 9/3297 |
| 2007/0288552 | A1 | 12/2007 | Snyder |
| 2009/0279441 | A1 | 11/2009 | Wong et al. |
| 2009/0285575 | A1* | 11/2009 | Abidi ....................... H04J 3/14 398/12 |
| 2013/0088977 | A1 | 4/2013 | Baillargeon |
| 2014/0029441 | A1 | 1/2014 | Nydell |
| 2014/0029442 | A1* | 1/2014 | Wallman ................. H04L 69/22 370/241.1 |
| 2014/0119221 | A1* | 5/2014 | Park ........................ H04L 43/16 370/252 |
| 2014/0169183 | A1 | 6/2014 | Allan et al. |
| 2014/0258524 | A1 | 9/2014 | Thyni et al. |
| 2014/0301215 | A1* | 10/2014 | Somoskoi ........... H04L 43/0852 370/252 |
| 2015/0056995 | A1 | 2/2015 | Baillargeon |
| 2016/0028603 | A1* | 1/2016 | Chakrabarti ........ H04L 43/0852 370/252 |
| 2016/0191367 | A1* | 6/2016 | Mirsky ................... H04L 69/28 709/203 |
| 2016/0218927 | A1* | 7/2016 | Johnsson ................ H04L 41/12 |
| 2016/0352865 | A1* | 12/2016 | Gupta ..................... H04L 67/42 |
| 2017/0019323 | A1* | 1/2017 | Allan ...................... H04L 43/10 |
| 2017/0289011 | A1* | 10/2017 | Johnsson ................ H04L 43/10 |
| 2018/0165693 | A1 | 6/2018 | Jain et al. |
| 2018/0270149 | A1* | 9/2018 | Jiao ........................ H04L 29/08 |
| 2018/0375753 | A1* | 12/2018 | Mirsky ............... H04L 41/0873 |
| 2019/0059008 | A1* | 2/2019 | Liu ....................... H04W 24/04 |

OTHER PUBLICATIONS

Hedayat, RFC 5357: A Two-Way Active Measurement Protocol, 2008 (Year: 2008).*
Morton, RFC 5938: Individual Session Control Feature for the Two-Way Active Measurement Protocol, 2010 (Year: 2010).*
Yang by example, https://trac.ietf.org/trac/edu/raw-attachment/wiki/IETF94/94-module-2-yang.pdf, Nov. 5, 2015, 35 pages.
"TWAMP Explained Measuring Performance in IP Networks", RAD www.rad.com, Sep. 2014, pp. 1-11.
Mirsky, et al., "Two-Way Active Measurement Protocol (TWAMP) Light Data Model", Network Working Group, Jun. 28, 2016, Internet draft valid for 6 months, http://datatracker.ietf.org/drafts/current/, 21 pages.
Clark, "RFC 813 Window and Acknowledgement Strategy in TCP", MIT Laboratory for Computer Science Computer Systems and Communications Group, Jul. 1982, 22 pages.
"RFC 793—Transmission Control Protocol", Darpa Internet Program, Protocol Specification, Sep. 1981, 90 pages.
Civil, et al., "Two-Way Active Measurement Protocol (TWAMP) Data Model", draft-ietf-ippm-twamp-yang-05, Oct. 18, 2017, Internet draft valid for 6 months, http://datatracker.ietf.org/drafts/current/ Draft, 65 pages.
Hedayat, et al., A Two-Way Active Measurement Protocol (TWAMP), Network Working Group, Standards Track, Copyright (c) The IETF Trust (2008), Oct. 2008, 26 pages.
"Zero-touch Network and Service Management—Introductory White Paper", Miscellaneous Contributing Organisations & Authors, available at this link: https://portal.etsi.org/TBSiteMap/ZSM/OperatorWhitePaper, Dec. 7, 2017, 5 pages.
Morton, "RFC 6673 Round-Trip Packet Loss Metrics", ISSN: 2070-1721, AT&T Labs, Internet Engineering Task Force (IETF), https://tools.ietf.org/html/rfc6673, Aug. 2012, 28 pages.
Demichelis, et al., "RFC 3393 IP Packet Delay Variation Metric for IP Performance Metrics (IPPM)", Network Working Group, https://tools.ietf.org/html/rfc3393, Nov. 2002, 42 pages.
Mills, "RFC 1305 Network Time Protocol (Version 3) Specification, Implementation and Analysis", Network Working Group, Electrical Engineering Dept., University of Delaware, mills@udel.edu, Mar. 1992, 115 pages.
"Test and Monitoring Solutions for SDN and DNFV Network Operations", Spirent, spirent.com, Jun. 9, 2016, pp. 1-8.
"ETSI GS NFV-REL 004 V1.1.1", Network Functions Virtualisation (NFV); Assurance; Report on Active Monitoring and Failure Detection, http://www.etsi.org/standards-search, Apr. 2016, pp. 1-61.
Ersue, "ETSI NFV Management and Orchestration—An Overview", IETF #88, Vancouver, Canada, Published E2E Arch, REQ, Use Case,Terminology documents in ETSI NFV Open Area: http://docbox.etsi.org/ISG/NFV/Open/Published/, Jan. 2, 2014, 14 pages.
"RFC 7750—Differentiated Service Code Point and Explicit Congestion Notification Monitoring", Internet Engineering Task Force (IETF), Feb. 2016, 11 pages.
U.S. Appl. No. 15/919,135—Office Action dated Aug. 15, 2019, 21 pages.
U.S. Appl. No. 15/919,039—Non-Final Office Action dated Nov. 14, 2019, 12 pages.

* cited by examiner

FIG. 11
(PRIOR ART) TWAMP Session-Sender Test Packet

Sequence Number (4 bytes)
Timestamp (8 bytes)
Error Estimate (2 bytes)
Packet Padding (Variable bytes)

FIG. 12
(PRIOR ART) TWAMP Session-Reflector Test Packet

Sequence Number (4 bytes)
Timestamp (8 bytes)
Error Estimate (2 bytes)
MBZ (2 bytes)
Receive Timestamp (8 bytes)
Sender Sequence Number (4 bytes)
Sender Timestamp (8 bytes)
Sender Error Estimate (2 bytes)
MBZ (2 bytes)
Sender TTL (1 byte)
Packet Padding (Variable bytes)

```
 1  curl -X POST --header 'Accept: application/yang-data+json' 'http://
    10.32.88.27:8080/api/v2/data/vta-twamp:test-twamp-client/client/test-
    sessions=TWAMP_CLIENT/'
 2  {
 3    "vta-twamp:test-sessions": [
 4      {
 5        "name": "TWAMP_CLIENT",
 6        "test-controller": {
 7          "backup-controller-address": "",
 8          "controller-address": "127.0.0.1",
 9          "measurement-method": "string",
10          "test-group-id": "1",
11          "tram-endpoint": "http://127.0.0.1:8082/api/v2/results/1/"
12        },
13        "test-parameters": {
14          "duration": 5,
15          "fps-list": [
16            5
17          ],
18          "reporting-interval": 300,
19          "retry-interval": 30,
20          "sequence-checking": true,
21          "stream-list": [
22            {
23              "address": "3.3.3.40",
24              "gateway": "3.3.3.1",
25              "prefix": "3.3.3.0/24",
26              "qos-ctrl": 10,
27              "start-time-format": "strict",
28              "stream-info-list": [
29                {
30                  "dst-port": 13000,
31                  "fps": 5,
32                  "frame-len": 256,
33                  "jitter-thresh-far": 10,
34                  "jitter-thresh-near": 10,
35                  "jitter-thresh-rt": 10,
36                  "latency-thresh-far": 10,
37                  "latency-thresh-near": 10,
38                  "latency-thresh-rt": 10,
39                  "padding": "pseudo",
40                  "qos": 40,
41                  "src-port": 1123
42                }
43              ],
44              "twamp-port": 862
45            }
46          ],
47          "tmo": 250,                                    ⎯ 1658
48          "virtual-link": {
49            "connection-point": {
50              "ipv4": {
51                "addr": "3.3.3.51",
52                "gateway": "3.3.3.1",
53                "prefix": "3.3.3.0/24"
54              }
55            },
56            "connectivity-type": "ELINE",
57            "id": 1,
58            "root-requirement": {
59              "cbs": 100,
60              "cir": 10                                         61 }
                                                                  62 }
                                                                  63 }
                                                                  64 }
                                                                  65 ]
                                                                  66 }
```

FIG. 16

KEY PERFORMANCE INDICATORS (KPI) FOR TRACKING AND CORRECTING PROBLEMS FOR A NETWORK-UNDER-TEST

RELATED APPLICATIONS

This application is related to U.S. patent application Ser. No. 15/919,039, entitled "SECURE METHOD FOR MANAGING A VIRTUAL TEST PLATFORM", filed on Mar. 12, 2018. The related application is incorporated by reference for all purposes.

This application is related to U.S. patent application Ser. No. 15/919,105, entitled "ACCELERATION OF NODE CONFIGURATION FOR TWAMP WITH A LARGE NUMBER OF TEST SESSIONS" filed on Mar. 12, 2018. The related application is incorporated by reference for all purposes.

This application is related to U.S. patent application Ser. No. 15/919,135, entitled "SCALABILITY, FAULT TOLERANCE AND FAULT MANAGEMENT FOR TWAMP WITH A LARGE NUMBER OF TEST SESSIONS" filed on Mar. 12, 2018. The related application is incorporated by reference for all purposes.

FIELD OF THE TECHNOLOGY DISCLOSED

The technology disclosed relates generally to performance measurement of telecommunication transport networks with a large number of test sessions. More specifically, the technology discloses enhancing the Two-Way Active Measurement Protocol (TWAMP) protocol with the measurement of new service level key performance indicators (KPIs) for optimizing delivery of Internet Protocol (IP) multimedia services over conventional, software-defined networking (SDN) and network-function virtualization (NFV) network architectures.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Network management requires continuous real-time monitoring of current network status and performance, to control the resources of the network to optimize the services delivered over the network.

Two-Way Active Measurement Protocol (TWAMP) has been standardized by the Internet Protocol Performance Metrics (IPPM) working group of the Internet Engineering Task Force (IETF) for characterizing the performance measurement of telecommunication transport networks—for measuring two-way, also referred to as round-trip, metrics between network devices. Two-way measurements are common in IP networks, primarily because synchronization between local and remote clocks is unnecessary for round-trip delay, and measurement support at the remote end may be limited to a simple echo function. The TWAMP protocol has a TWAMP-Control phase and a TWAMP-Test phase. The TWAMP-Control phase is used to initiate, start and stop test sessions between Control-Client and Server logical entities. The TWAMP-Test phase is used to exchange test packets and measure network performance metrics.

Network management requires continuous real-time monitoring of current network status and performance, to control the resources of the network to optimize the services delivered over the network. Key performance indicators (KPI) are metrics whose trends can be used to track performance for the network-under-test. The delay, packet loss and jitter KPIs specified in the TWAMP standard measure network quality at the network level.

An opportunity arises to offer more accurate representation of the quality of experience of services delivered over the network-under-test, by disclosing new service application level KPIs that extend the TWAMP measurement architecture. Enhanced performance measurement testing on a large scale, using a disclosed mesh topology with new KPIs with TWAMP measurement architecture, can improve the quality of network management.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a method of launching and updating a measurement architecture using TWAMP for measuring performance of large telecommunications networks, via a mesh network. The method includes a control-client, running on a first network host, receiving and parsing a configuration file to populate an in-memory data store with destination IP addresses, TCP and UDP transport ports, IP quality of service (QoS) parameters, and test session parameters for key performance indicators (KPI) used to originate a test including a set of two-way test sessions originating from the first network host. The control-client originates test sessions with control-servers and session-reflectors using the test session parameters that specify the KPIs; and the method extends to dozens to thousands of control-clients running on additional network hosts. The control-clients receive configuration files for originating respective test sessions with control-servers in a mesh network using respective test session parameters. Optionally, while the test is running, the test operator can send an updated configuration file to at least one control-client that introduces a new control-server or replaces a control-server; and causes the control-client to expand the test to include the new or replacement control-server without stopping or restarting TW test sessions with other control-servers. The disclosed method also includes monitoring the running test and receiving reports of results from the network hosts. Many new key performance indicators are specified, and described infra.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 11 shows message fields for a TWAMP Session-Sender test packet, for reference.

FIG. 12 shows message fields for a TWAMP Session Reflector test packet, for reference.

FIG. 16 shows an example REST API command for starting test sessions at a TWAMP client.

DETAILED DESCRIPTION

Figure 1:
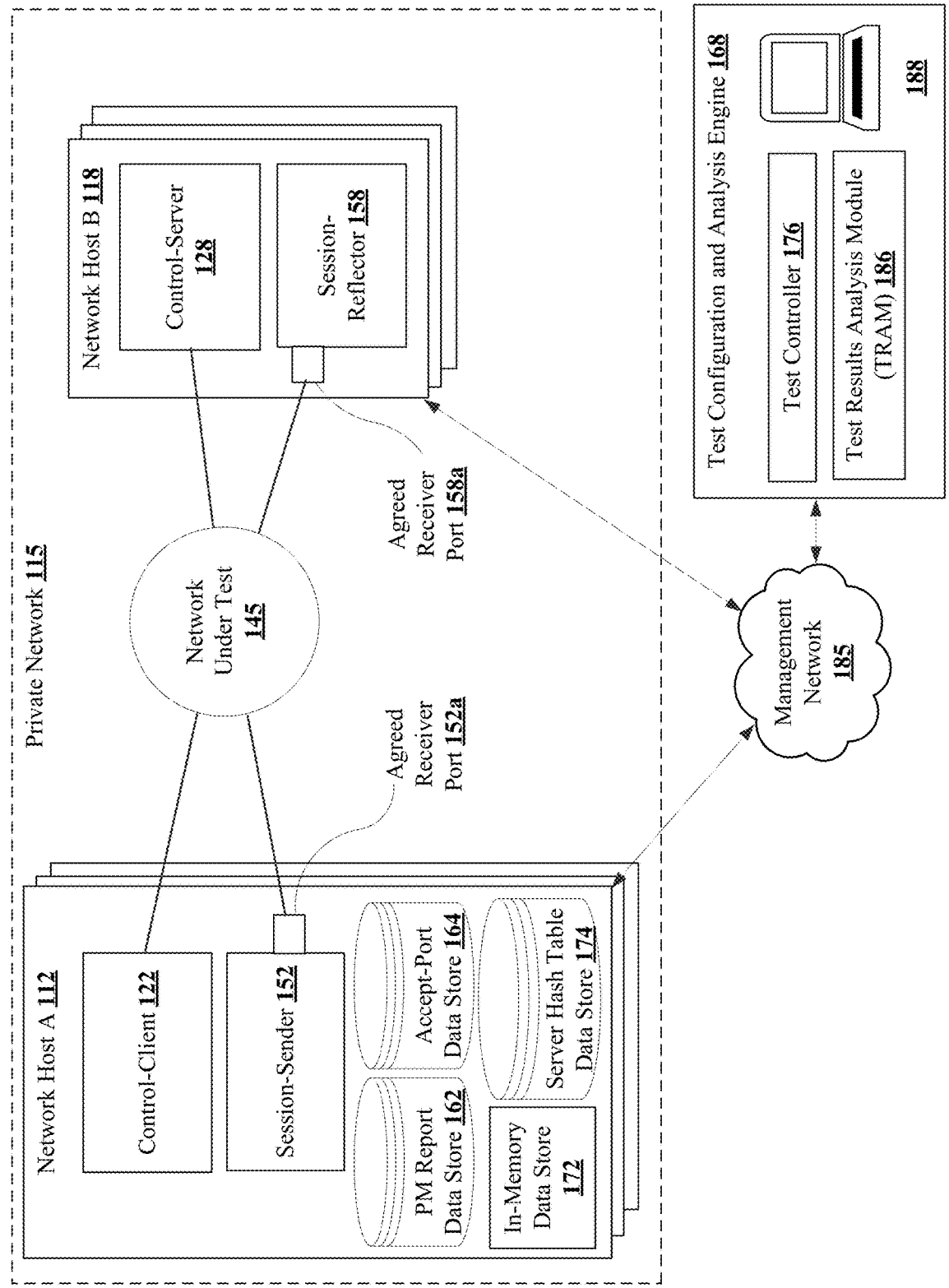
FIG. 1 depicts an exemplary system for tracking and correcting problems for a network-under-test using newly disclosed key performance indicators (KPI), and thereby improving scalability and fault tolerance for TWAMP with a large number of test sessions, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Network management requires continuous real-time monitoring of current network status and performance to control the resources of the network to optimize the services delivered over the network. Key performance indicators (KPI) are metrics whose trends can be used to track mean time to restore (MTTR) the network, availability of the network, congestion in the network and other measures of performance for the network-under-test. KPIs can be used by operational personnel to make network improvements and can be delivered to business units as data for taking executive actions. The KPIs specified in the TWAMP standard for measuring quality at the network level include delay, packet loss and jitter KPIs.

The disclosed technology enhances the TWAMP protocol with the measurement of new service level key performance indicators (KPIs) for optimizing delivery of IP (Internet Protocol) multimedia services over conventional, SDN or NFV network architectures.

A network-under-test can use various network architectures: a conventional network architecture comprising routers and switches, a network-function virtualization (NFV) architecture comprising virtualized routers and switches, or a software-defined networking (SDN) architecture in which the control plane and data plane are separated into white box routers and switches.

The disclosed technology includes new service application level KPIs that offer more accurate representation of the quality of experience of the network services. The new KPIs are specified at the session level, which translates to service application level performance indicators for the network operator, for SDN and NFV-based network architectures.

In the conventional TWAMP measurement architecture there are only two hosts, each with specific logical entities. The host that initiates the TWAMP control phase contains the control-client and session-sender logical entities and the other host contains the server and session-reflector logical entities. TWAMP control and test packets follow a single logical path through the network between these two hosts. That is, TWAMP, control-client and session-sender logical entities reside in one network host and the server and session-reflector logical entities reside in another network host with the network whose performance is being measured positioned between the two hosts.

In a local mesh network topology, infrastructure nodes connect directly, dynamically and non-hierarchically to as many other nodes as is feasible for the system being implemented and cooperate with one another to efficiently route data. The lack of dependency on one node allows for every node to participate in the relay of information, and mesh networks can dynamically self-organize and self-configure, as well. In a full mesh network, each node is connected to every other node in the network.

Full mesh measurement architecture enables the capability to measure many network paths. An example system for extending the TWAMP architecture and for measuring newly disclosed service level KPIs, using a full mesh network topology is described next.

FIG. 1 shows example architecture 100 for improving scalability and fault tolerance for TWAMP performance measurement with a large number of test sessions. Architecture 100 includes network host A 112 with control-client 122 and session-sender 152 with agreed receiver port 152a, and network host B 118 with control-server 128 and session-reflector 158 with agreed receiver port 158a. As shown in FIG. 1, control-client 122 and session-sender 152 logical entities reside in one network host and the control-server 128 and session-reflector 158 logical entities in another network host with the network whose performance is being measured between these two hosts. The host that initiates the transmission control protocol (TCP) connection takes the role of control-client 122 and session-sender 152. In one implementation, multiple control-clients, session-senders, servers and session-reflectors can be resident in a private network 115. A single set of components is discussed as representative of the functionality common to dozens to thousands of control-clients and servers. Hundreds to thousands of control-clients, session-senders, control-servers and session-reflectors are represented in FIG. 1 via the cascading hosts. In one implementation, multiple control-clients, session-senders, servers and session-reflectors can be resident on a single host.

In software-defined networking (SDN) and network-function virtualization (NFV) environments, network host A 112 and network host B 118 can be virtual test platforms (VTPs) and control-client 122 and control-server 128 can run as virtual test applications (VTAs) on virtual network functions (VNFs) inside a virtual machine (VM) or in a Docker container running on a physical host. The VM is a self-contained environment with its own operating system (VMOS) separate from the host operating system which runs the hypervisor and controls the VMs. Each VM has its own processor address space, memory address space and networking address space with network layer resources including Internet Protocol (IP) addresses and transport layer resources including TCP or UDP port numbers. A Docker container is a lightweight self-contained environment sharing the host operating system, but with its own processor address space, memory address space and networking address space with network layer resources including IP addresses and transport layer resources including TCP or UDP port numbers.

SDN and NFV based network architectures come with a wide range of requirements, including massive capacity, imperceptible latency, ultra-high reliability, and support for massive machine-to-machine communication. Networks are being transformed into programmable, software-driven, service-based and holistically-managed infrastructures.

Continuing with the description of FIG. 1, network host A 112 includes accept-port data store 164 for storing proposed User Datagram Protocol (UDP) ports, indexed by an order in which the ports for test sessions are allocated. Network host A 112 also includes server hash table data store 174 for storing server and test session information for VTAs, to be used for TWAMP testing. Additionally, FIG. 1 shows network-under-test 145, which can use NFV architecture comprising virtualized routers and switches, an SDN architecture in which the control plane and data plane are separated into white box routers and switches, or a conventional network architecture comprising routers and switches.

Also included in architecture 100 is management network 185 through which test configuration and analysis engine 168 communicates with the TWAMP control-clients in network host A 112 and TWAMP control-servers in network host B 118.—including configuration files for TWAMP servers to be used in TWAMP tests. Test configuration and analysis engine 168 includes test controller 176, test results analysis module (TRAM) 186, and performance measurement (PM) report data store 162.

The configuration file is designed for service assurance testing of a customer's revenue generating SDN network. Control setup is one of the procedures that is needed as part of the testing. A network operator specifies network routes as part of the virtual platform. A network maintenance operations manager sets up the configuration files for the network to be tested, including details such as how many test sessions for which server nodes, via user interface 188. In some implementations, multiple network maintenance operations managers, each setting up configuration files for testing systems in their own company's network name spaces, could utilize multiple test controllers to configure multiple sets of test sessions for multiple networks. Test controller 176 sends the completed configuration file to control-client 122, which parses the configuration file and creates an in-memory data store with accept-port data structure content and server hash table data store content.

When session tests are complete, control-client 122 stores the performance measurement results in PM report data store 162 and sends the performance metric session test results to TRAM 186 for use by test controller 176 in analyzing the network-under-test. Statistics are calculated and reports are generated for KPIs using a statistics and reporting thread that accesses the common statistics data store which maintains statistics per stream and session in PM report data store 162. In one implementation, TRAM 186 is an integral part of test configuration and analysis engine 168 that collects or receives test results from the network hosts and analyzes test results and presents the results to an operator in an actionable format via user interface 188. In one implementation, the reports can be very large and they get generated often—potentially every one minute, two minutes or ten minutes, depending on the configuration parameters set by the operator to test the specific network. For example, testing of a network with three thousand nodes with 120 kB per five minutes for each node produces billions of bytes of test results per twenty-four hour period. In some implementations the report data gets analyzed via big data analytics.

In some implementations, test controller 176 manages the test agents and probes, providing test instructions to the test probes, coordinating the test scheduling when multiple tests with large number of test probes are executed, and retrieving results from TRAM 186 to provide actionable information to the network operator.

The hierarchy of the TWAMP streams and sessions can be represented as follows.

Stream1
   Session1
   Session2
   ...
Stream2
   Session1
   Session2
   ...
...

Session-sender 152 and the session-reflector 158 exchange test packets according to the TWAMP test protocol for each active session. Session-sender 152 transmits TWAMP test packets with a transmit timestamp and sequence number, as shown next. A TWAMP test session-sender message includes the following message fields.

Sequence Number (4 bytes)
Timestamp (8 bytes)
Error Estimate (2 bytes)
Packet Padding (Variable bytes)

An example test message sender frame data structure is shown next.

```
typedef struct{
    uint32_t        sequence_number;
    uint64_t        timestamp;
    unsigned short  error_estimate;
}__attribute__((packed)) twamp_sender_frame_payload_t;
```

Session-reflector 158 reflects this packet back to session-sender 152 after inserting a timestamp and sequence number and copying the sender's timestamp and sequence number, as shown next. A TWAMP-test session-reflector message includes the following message fields. MBZ refers to 'must be zero'.

Sequence Number (4 bytes)
Timestamp (8 bytes)
Error Estimate (2 bytes)
MBZ (2 bytes)
Receive Timestamp (8 bytes)
Sender Sequence Number (4 bytes)
Sender Timestamp (8 bytes)
Sender Error Estimate (2 bytes)
MBZ (2 bytes)
Sender TTL (1 byte)
Packet Padding (Variable bytes)

An example of the receiver frame payload data structure is shown next.

```
typedef struct{
    unsigned int        sequence_number;
    uint64_t    timestamp;
        unsigned short error_estimate;
    unsigned short              MBZ_1;
    uint64_t    rcvd_timestamp;
    unsigned int
        sender_sequence_number;
    uint64_t    sender_timestamp;
        unsigned short sender_error_estimate;
    unsigned short              MBZ_2;
    unsigned char               sender_TTL;
}__attribute__ ((packed)) twamp_receiver_frame_payload_t;
```

Session-sender 152 uses the received information to calculate key performance indicators (KPIs) including packet loss, packet out-of-sequence, packet delay and packet jitter characteristics of the network path between session-sender 152 and session-reflector 158, as well as disclosed new KPIs, described infra.

Figure 2:
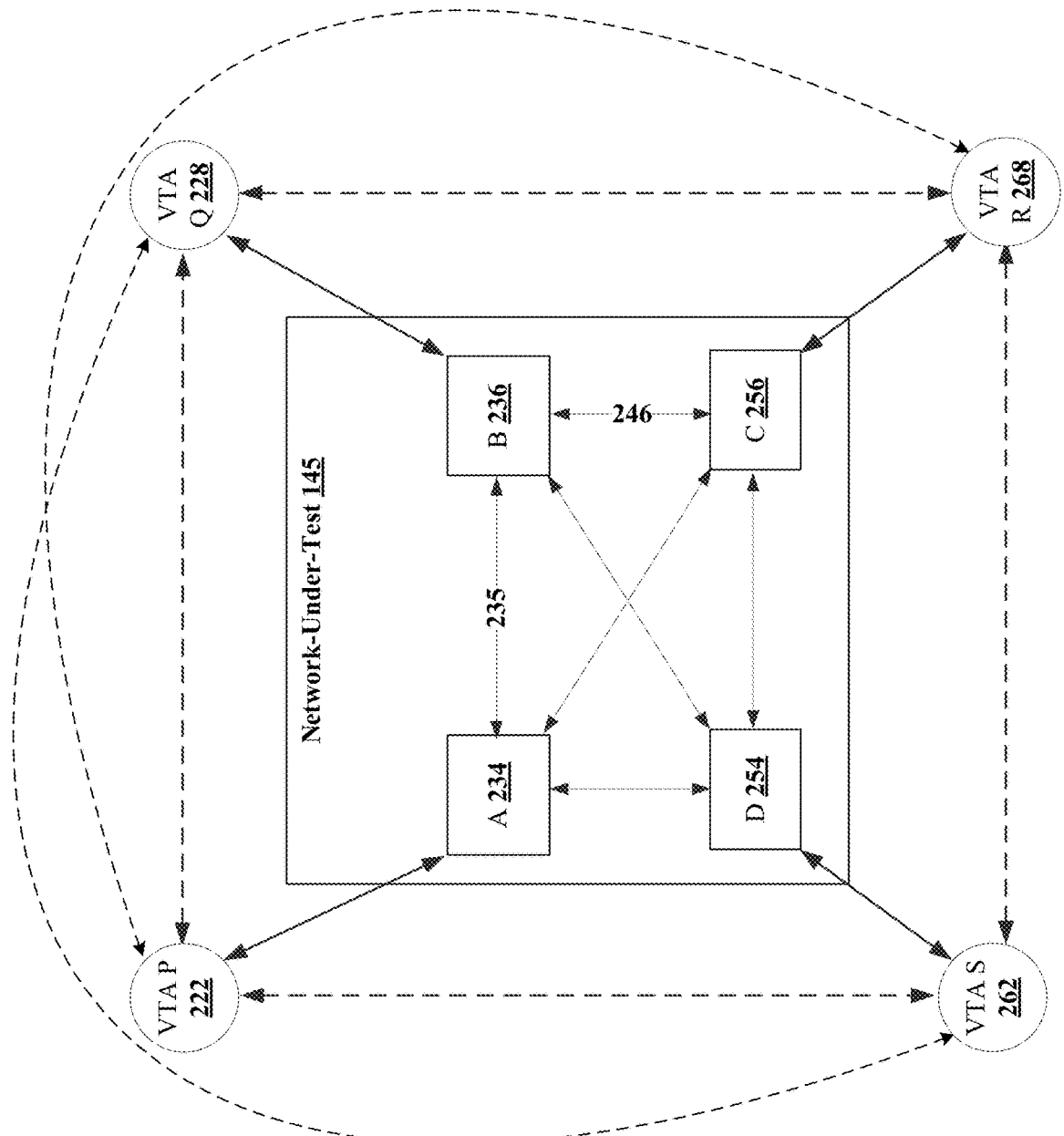
FIG. 2 shows an example mesh network for TWAMP testing of a network-under-test.

FIG. 2 shows an example mesh network for TWAMP testing of network-under-test 145. In the full mesh TWAMP measurement architecture, the TWAMP hosts are distributed at strategic points in network-under-test 145 which includes router A 234, router B 236, router C 256 and router D 254. VTA P 222, VTA Q 228, VTA R 268 and VTA S 262, which can each run both TWAMP client and server, provide service assurance to network-under-test 145. The dotted lines show virtual connections among the test nodes: VTA P 222, VTA Q 228, VTA R 268 and VTA S 262.

In the event of VTA Q failing or being taken away for maintenance, the network paths AB 235 and BC 246 can continue to be tested by the TWAMP client running on VTA P testing to TWAMP server running on VTA R or by TWAMP client running on VTA R testing to TWAMP server running on VTA P, if the network operator has set up the config file to include these tests between the routers in the network-under-test. In this document, config file and configuration file are used interchangeably, with the same meaning.

The node distribution for the mesh network is optimized in such a way that all the network paths can be fully characterized using KPI, including but not limited to one-way delay, jitter and packet loss. In this full mesh TWAMP measurement architecture, each TWAMP host is both the initiator and receiver of TWAMP test sessions. Assuming a full mesh of n hosts there would be (n−1) paths through the network. In the full mesh architecture this is extended to $(n-1)^2$ paths, in one implementation, to assure that multiple redundant paths through the network can be fully characterized using KPIs for superior service assurance in the network.

A configuration file that characterizes the addressing information and test parameters gets downloaded to each TWAMP host in the full mesh measurement architecture, at the beginning of the TWAMP test, via test controller 176. The host running TWAMP uses the information in the downloaded configuration file to initiate TWAMP tests to the other hosts running TWAMP server in the full mesh architecture.

As the underlying network scales, more and more new TWAMP hosts can be added to characterize new network paths. This requires modification of the configuration file that is being used by the existing TWAMP hosts. To ensure that the modification of the configuration file does not disrupt the ongoing network testing, the current disclosed technology includes a method to incorporate the newly added TWAMP hosts into the full mesh measurement architecture without the need to stop and restart the TWAMP test currently running on every TWAMP host, which can introduce gaps in the characterization of the network, as it takes time for the TWAMP testing to stabilize.

The disclosed technology also ensures fault tolerance: if some of the TWAMP hosts that are part of the full mesh measurement architecture fail or need to be removed for maintenance, they can be replaced with new TWAMP hosts and the configuration file can be augmented to include updated information, without disrupting the ongoing network testing.

Figure 3A:
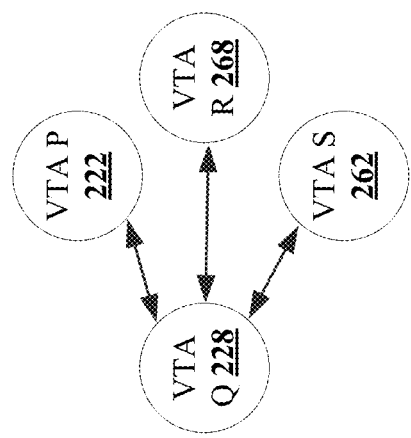
FIG. 3A shows connectivity for the example mesh network architecture of FIG. 2 for VTA P 222 client testing to TWAMP servers running on VTA Q 228, VTA R 268 and VTA S 262.
Figure 3B:
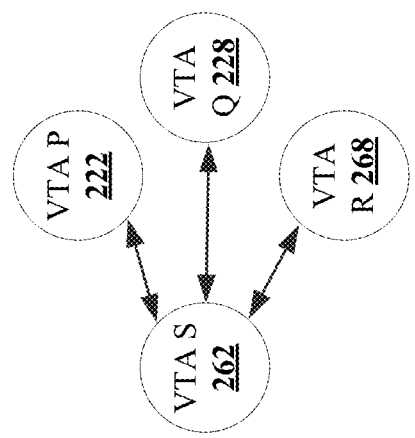
FIG. 3B, shows connectivity for the example mesh network architecture of FIG. 2 for VTA Q 228 testing to TWAMP servers running on VTA P 222, VTA R 268 and VTA S 262.
Figure 3C:
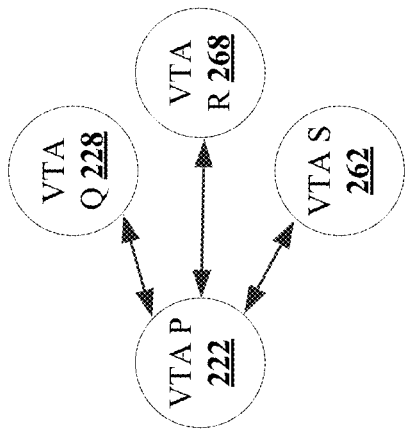
FIG. 3C shows connectivity for the example mesh network architecture of FIG. 2 for VTA R 268 testing to TWAMP servers running on VTA P 222, VTA Q 228 and VTA R 268.
Figure 3D:
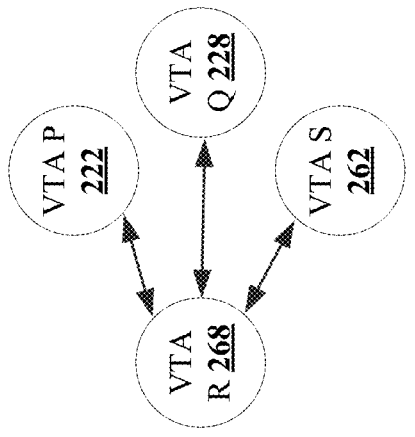
FIG. 3D shows connectivity for the example mesh network architecture of FIG. 2 for VTA S 262 testing to TWAMP servers running on VTA P 222, VTA Q 228 and VTA R 268.

FIG. 3A, FIG. 3B, FIG. 3C and FIG. 3D show connectivity for the example mesh network architecture of FIG. 2 and specify which virtual test agents receive configuration confirmation files for which probes. VTA P 222, VTA Q 228, VTA R 268 and VTA S 262 each run both TWAMP client and server. VTA P 222 client in FIG. 3A is testing to TWAMP servers running on VTA Q 228, VTA R 268 and VTA S 262. Similarly, VTA Q 228 in FIG. 3B is testing to TWAMP servers running on VTA P 222, VTA R 268 and VTA S 262. VTA R 268 in FIG. 3C is testing to TWAMP servers running on VTA P 222, VTA Q 228 and VTA R 268. VTA S 262 in FIG. 3D is testing to TWAMP servers running on VTA P 222, VTA Q 228 and VTA R 268. As can be seen from the connectivity model, in the event of VTA Q 228 failing or being taken away for maintenance, the network paths AB 235 and BC 246 continue to be tested by the TWAMP client running on VTA P 222 testing to TWAMP server running on VTA R 268 or by TWAMP client running on VTA R 268 testing to TWAMP server running on VTA P 222, depending on how the routes/paths are set up between the routers in network-under-test 145 by the network operator.

Configuration File

The config file is designed for service assurance testing of a customer's revenue generating SDN network and includes newly disclosed KPI parameters described infra. Control setup is part of the testing procedures.

In the example described relative to FIG. 3A-3D with four VTAs, test controller 176 downloads configuration files to the control-clients in each of VTA P 222, VTA Q 228, VTA R 268 and VTA S 262 at the beginning of the TWAMP test. The configuration file specifies how VTAs behave as source. The configuration file for each of the VTAs characterizes the addressing information, and includes IP addresses and both TCP and UDP transport port numbers, along with test parameters such as the test frame length and IP quality of service (QoS) parameters, to the TWAMP hosts in the full mesh measurement architecture.

```
[SERVER, <oVlan>,<oPtyCtrl>,[<iVlan>],[<iPtyCtrl>],<addr>,[<mask>],
[<gateway>],[<twampPort>],<qosCtrl>,[<startTimeFormat>],[<lightMode>]
<cr> <lf>
/* maps to the stream data structure struct __twamp__pm__stream__cfg */
[<oPty>, [<iPty>],<dstPort>,<srcPort>,<qos>,[<latencyThreshRt>],
[<jitterThreshRt>],[<padding>],[<latencyThreshNear>],
[<jitterThreshNear>],[<latencyThreshFar>],[<jitterThreshFar>],
[<sesLossThreshRt>],[<sesEnhThreshRt>],[<uasLossCriteriaRt>],
[<uasEnhCriteriaRt>],[<flowLabel>], [<fps>,<frmLen>,[<frmLenMax>] ]
<cr> <lf> ]+ ]+
/* maps to the session data structure struct __twamp__pm__sess__cfg */
```

Customers can specify as many servers and as many sessions as they prefer. The configuration file utilizes a unique ID for each of the servers. One <opty> refers to one server line. If ten sessions per server, then each server session would have ten [opty] lines. The + at the end of the example configuration file represents that there can be multiple servers and multiple sessions in those servers, and unique data.

A description of the fields used in the configuration file follows. <oVlan> is a VLAN tag for all test traffic to the respective server target, including control traffic. For all TWAMP control traffic associated with the respective server, <oPtyCtrl> is the priority for the VLAN tag. Note that priorities for TWAMP test traffic are specified independently on a per-stream basis (<oPty>/<iPty>). <iVlan> is the inner VLAN tag for all test traffic to the respective server target, including control traffic. For all TWAMP control traffic associated with the respective server, <iPtyCtrl> is the priority for the inner VLAN tag. It is only applicable if <iVlan> is present and greater than −1. If not applicable, it can be omitted. Destination IP address for test traffic, a TWAMP server is specified in the <addr> field. The address needs to be unicast, as the test will attempt to reject any broadcast address. The mask field includes an optional subnet mask and default gateway to use in conjunction with the <addr>. If specified, the test effectively configures a "sub-interface" that will use this information for routing decisions when it transmits traffic related to the respective target, rather than the original information specified. By allowing the direct specification of these parameters, any given stream can effectively transmit on any particular subnet on the link, aside from the original subnet established. <twampPort> is the TCP port number that the client connects to in order to set up the TWAMP test. This is the control traffic port used to set up the TWAMP session, not the port to which test traffic is sent once the session is set up. <qosCtrl> is the QoS setting for TWAMP control traffic, as a differentiated service code point (DSCP) numerical setting. This setting is for the initial traffic related to TCP setup negotiations and TWAMP control messages only. The TWAMP test traffic uses individual settings for each stream (<qos> or <qosX>). <startTimeFormat> is the format for the timestamp in the session request (Request-TW-Session) message. <lightMode> enables/disables TWAMP Light mode. When TWAMP Light mode is enabled, the test will allow test traffic to be initiated for all streams associated with the server even if the initial TCP connection fails.

Descriptions of stream-specific parameters follow. <oPty> and <iPty>: for TWAMP test traffic only, the priorities for the VLAN tags. <iPty> is only applicable if <iVlan> is present and greater than −1. If not applicable, it can be omitted. <dstPort>, for the respective stream, is the destination port; that is, the destination port number that appears in the UDP header of test packets transmitted by the unit (the "session-sender"). If the requested port is already in use or otherwise refused by the reflector, the client and server will negotiate and use a different port. In all cases, the actual port used is reported in the test results. <srcPort>, for the respective stream, the source port; that is, the source port number that appears in the UDP header of test packets transmitted by the unit (the "session-sender"). <qos> is the QoS setting for test traffic, as a DSCP or DiffServ numerical setting. This setting is for all test traffic except TCP setup negotiations and TWAMP control messages, which use the <qosCtrl> parameter. <latencyThreshRt> <latencyThreshNear> and <latencyThreshFar> are latency thresholds for the respective stream and path in msec, with a functional granularity of 0.1 msec., notated as follows: "RT", "Rt", or without notation—full roundtrip path. "NE" or "Ne"—near end path, referring to the latency of packets sent from the TWAMP reflector to the unit. "FE" or "Fe"—far end path, referring to the latency of packets sent from the unit to the TWAMP reflector. In the results, the test reports the total number of packets that exceeded these thresholds, respectively for the different paths. If any of these parameters are omitted, all results related to violations of the respective threshold will be reported as NA.

Continuing with further descriptions of stream-specific parameters, <jitterThreshRt>, <jitterThreshNear>, and <jitterThreshFar> are Jitter thresholds for the respective stream and path in msec, with a functional granularity of 0.1 msec., notated as follows: "RT", "Rt", or without notation—full roundtrip path. "NE" or "Ne"—near end path, referring to the jitter of packets sent from the TWAMP reflector to the unit. "FE" or "Fe"—far end path, referring to the jitter of packets sent from the unit to the TWAMP reflector. In the results, the test reports the total number of packets that exceeded these thresholds, respectively for the different paths. If any of these parameters are omitted, all results related to violations of the respective threshold will be reported as NA. <padding> is packet padding in TWAMP test packets, as defined in the RFC. <sesLossThreshRt>, <sesEnhThreshRt> are percentages that determine when loss-based and "enhanced" severely-errored seconds (SES) are counted (respectively), for reporting in the results. Note that this parameter is ignored if <calAvail>=OFF (command input parameter). <uasLossCriteriaRt>, <uasEnhCriteriaRt> are criteria by which the test determines whether an interval enters a loss-based or an enhanced "unavailable window" (respectively), after which severely-errored seconds become counted as unavailable seconds (UAS). The value represents the number of consecutive seconds after which severely-errored seconds trigger an unavailable window event. Note that this parameter is ignored if <calAvail>=OFF (command input parameter). <fps> is the frame rate for the stream, in frames per second (fps). <flowLabel> is an IPv6 flow label, applicable only when the target is an IPv6 address. <frmLen> is the frame size to use for the stream, in bytes. The frame size represents the total number of bytes in the Ethernet frame including the FCS but not the VLAN tag(s). <frmLenMax> is the maximum frame size to use for the stream, in bytes. If specified, the stream uses a range of frame sizes between <frmLen> and <frmLenMax>. Otherwise, all frames are the size of <frmLen>. Note that when a range of sizes is used, the distribution of sizes across the range is even.

In the full mesh architecture, each TWAMP client uses the information in the configuration file, described supra, to initiate TWAMP tests to the TWAMP server specified in the configuration file.

Figure 4:
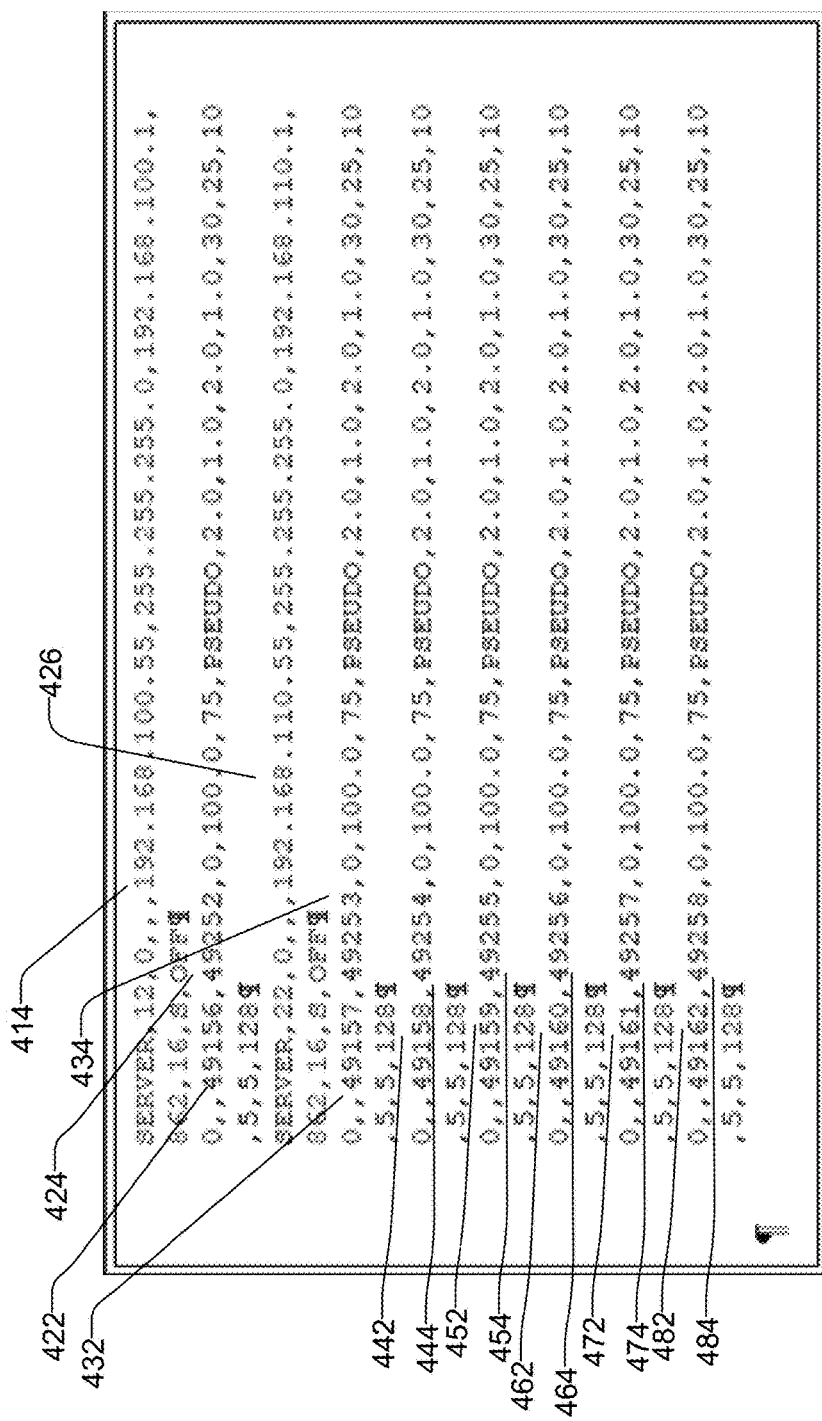
FIG. 4 shows an excerpt of config file twamp3000.cfg with 3000 sessions.

FIG. 4 shows an example config file for a first test session to a TWAMP server at 192.168.100.55 414. The config files shows a single session that tests a representative voice over Internet protocol (VoIP) call service between two people. The VoIP call uses real-time transport protocol (RTP) over UDP using destination UDP port number of 49156 422 and source UDP port number of 49252 424. The second test session to a TWAMP server at 192.168.110.55 426 has six sessions that test a representative IP video conference call service which has a VoIP component and an IP video component between three people. The first three sessions specify the 3 VoIP streams between the three people and the next three sessions specify the IP Video streams between the three people. The VoIP stream one uses destination UDP port number 49157 432 and source UDP port number 49253 434. The VoIP stream two uses destination UDP port number 49158 442 and source UDP port number 49254 444. The VoIP stream three uses destination UDP port number 49159 452 and source UDP port number 49255 454. The IP Video stream one uses destination UDP port number 49160 462 and source UDP port number 49256 464. The IP Video stream two uses destination UDP port number 49161 472 and source UDP port number 49257 474. The IP Video stream three uses destination UDP port number 49162 482 and source UDP port number 49258 484. The service level KPI thresholds that are optimized for VoIP or video services for specific customers, based on their gold, silver and bronze service level agreements (SLAs) which include pricing agreements, can be specified for these sessions and the KPI values can be measured and their statistical trends can be observed. KPIs are described in detail infra.

Server hash table data store 174 is implemented as a hash table—an associative array that maps a test session server to the session data specified in the configuration file for testing. A hash function is used to compute an index into the array to the session server. An advantage of using the hash table is the minimal time taken to insert, access, and delete entries. When the maximum number of entries is known at the time of test creation, hash tables are very efficient. In this implementation, the server addressing information is six bytes.

Hashing is the method of distributing the entries, which are the key/value pairs, into an array of buckets. Given a key, the hash function computes an index marking the location of the entry. The load factor is an important performance indicator for the hash table: load-factor=n/b where n is the number of entries as key/value pairs, and b is the number of buckets in the array. In one implementation, a load-factor of 0.5 has been empirically found to be optimal.

Index=f(key) where f is the hash function.

The index can be calculated as follows:

hash=hash_func(key, keylen, magic_number).

The magic number is empirically calculated for different datasets. A magic number that is appropriate for one example dataset is 0x5a5ee1d9. Hash functionality includes mixing the key value using standard arithmetic operators, including shifts and exclusive-or operations using further magic numbers such as 0x5bd1e995 and 12 so that a resultant hash value spreads across the key address space to prevent collisions. The index can be calculated as follows.

Index=hash & (array-size−1)

In one use case, the array-size is selected to be $2^i$ in which the exponent i is close to the value of 2*n, to get a load-factor of 0.5 and to avoid the use of the modulo operator and use the 'and' operator, which can be implemented faster in the CPU hardware.

In one implementation an open addressing strategy, with linear probes with the probe interval set to 1, is utilized to prevent collisions. Using this strategy, when a new entry needs to be inserted, the index can be calculated using the key as described supra. If the entry is occupied, indicating a collision, the subsequent buckets are probed one at a time until an empty index is found and the entry is inserted there. Search for the entry proceeds in a similar manner. This can be represented mathematically as follows.

Let U be the universe of possible keys $U \rightarrow \{0, 1, \ldots, n\}$. Let H be the hash table with the smaller set of keys: $H \rightarrow \{0, 1, \ldots, m\}$ where m<n.

Element with key k hashes to slot $\theta(k)$ using the hash function $\theta$ $U \rightarrow H$. The operations then become HASH-INSERT(T,x) with insert x in $T[\theta(k)]$ where k is key for x. If $T[\theta(k)]$ is not empty, use open addressing with linear probing to find slot r and insert x in T[r]. Operation HASH-DELETE(T,x) specifies delete x from $T[\theta(k)]$. If x is not the value at $T[\theta(k)]$ then use open addressing with linear probing to find slot r and delete x from T[r]. Third operation is HASH-SEARCH(T,x): search for an element x with key k in $T[\theta(k)]$. If the value doesn't match x, then use open addressing with linear probing to find slot r with a value that matches x and return it.

Figure 5:
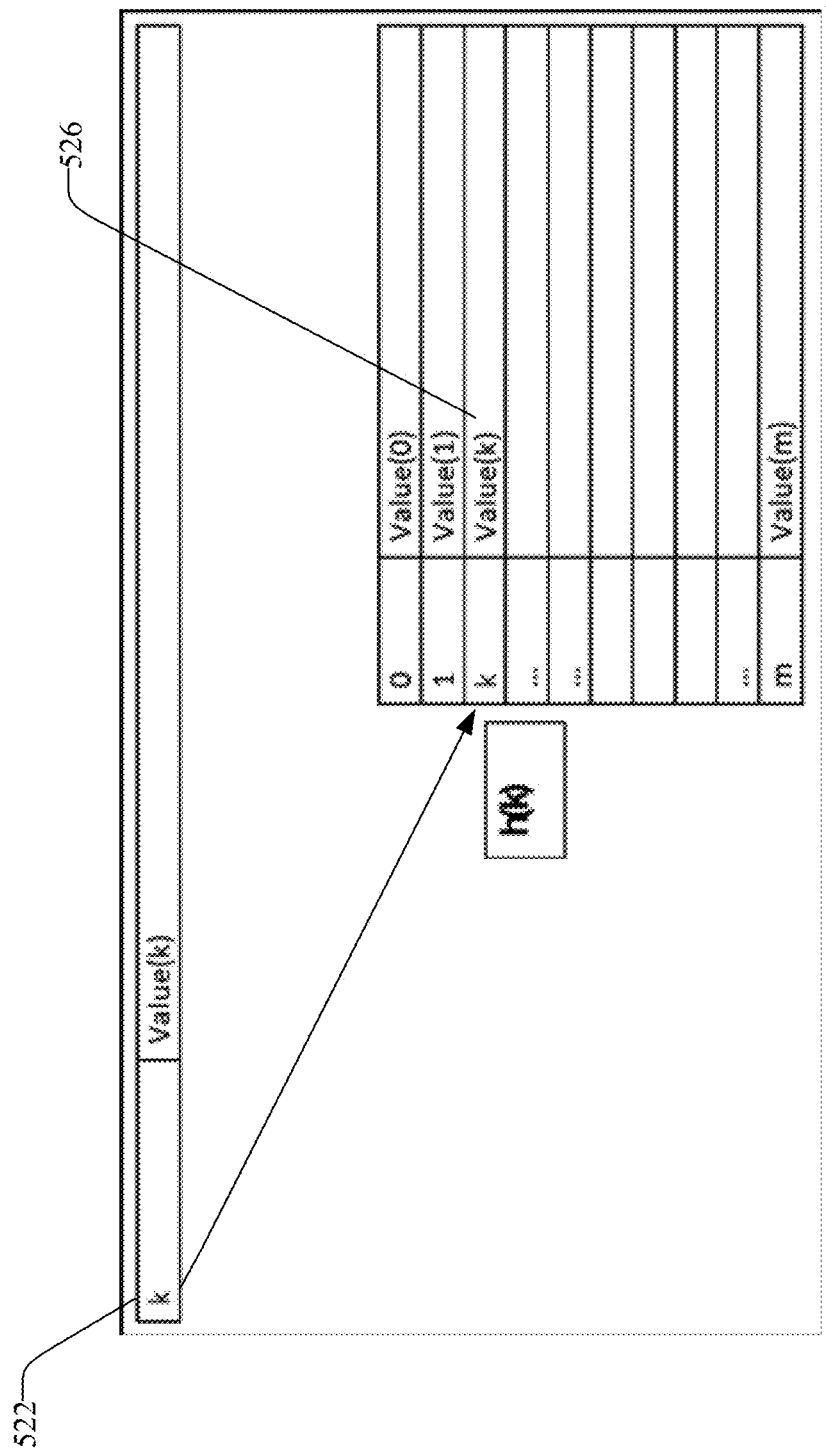
FIG. 5 shows an example server hash table data store entry.

FIG. 5 shows an example server hash table data store entry. The 6-byte input k 522 consists of a 4-byte IP address and a 2-byte UDP port, which is a transport layer endpoint of the end-to-end test session. In one implementation, the 6-byte input is a 4-byte IPv4 address extensible to 16-byte IPv6 addresses which is a network layer endpoint of the end-to-end session, and a 2-byte UDP port number. In an implementation of IPv6 the input would be extended to 18 bytes. The 6-byte input k 522 is hashed to an index within 0-6143 for 6,144 possible entries. Each value (k) 526 is a pointer to the stream and associated session info data stored in memory, as shown in the following data structures. When the configuration file is downloaded to the TWAMP client, it is parsed and converted and stored to an in-memory data store.

TWAMP performance metric stream configuration parameters are listed next. Index values can communicate packet stream characteristics along with one or more metrics to be measured. The per-stream config data structure is described next.

```
typedef struct __twamp_pm_stream_cfg
{
    uint32 server;
    uint32 mask;
    uint32 gateway;
    StartTimeFormatType start_time_format;
    LightModeType light_mode;
    uint16 vlan:13;
    uint16 pty_ctl:3;       /* vlan priority */
    uint16 iVlan:13;
    uint16 iPty_ctl:3;      /* inner vlan priority */
    uint16 twamp_port;
    uint16 qos_ctl;
} twamp_pm_stream_cfg_t;
```

The per-session config data structure is described next.

```
typedef struct __twamp_pm_sess_cfg
{
    avail_thresh_t avail_thresh;
    int lat_thresh_rt;      /* in us */
    int jitt_thresh_rt;     /* in us */
    int near_lat_thresh;    /* in us */
    int near_jitt_thresh;   /* in us */
    int far_lat_thresh;     /* in us */
    int far_jitt_thresh;    /* in us */
    int fps;
    int frame_len;
    int frame_len_max;
    calcType calAvail;
    calcType calSD;
    PaddingType padding;
    uint16 dst_port;
    uint16 src_port;
    uint8 pty_data;         /* vlan priority */
    uint8 iPty_data;        /* inner vlan priority */
    uint8 qos_dscp;
} twamp_pm_sess_cfg_t;
```

Scalability and fault tolerance is enabled with the use of this configuration file and hash table. Parsed configuration file data, including test session parameters for a server node and set of test sessions, is stored in an in-memory data store. Whenever the initial configuration file is downloaded to the TWAMP client, the server hash table data store is initialized and maintained. The configuration file is parsed and the server addressing information is used to generate a hash to index into this hash table. The entry at this index is marked as being in use.

If a new VTA is introduced into the TWAMP measurement architecture, for scalability, the configuration file is updated with the information about this new VTA. If a VTA fails or needs to be removed for maintenance and a replacement VTA is introduced into the TWAMP measurement architecture for fault tolerance, the configuration file gets updated with the information about this replacement VTA. When nodes are removed from the test, results from those nodes are not reported. The TWAMP client, on receiving a new configuration file, parses it and checks the server hash table for information about the new VTA. If the server information is not found, then this is assumed to be a new VTA and testing can start to this new VTA. This disclosed technology enables the capability to address scalability and fault tolerance in the TWAMP measurement architecture without affecting the testing that is in progress to the VTAs that are already deployed in network-under-test 145.

For fault tolerance in monitoring of a network-under-test, three cases are described next. In the case in which a server goes offline, TRAM 186 detects that the test results are indicating 100% packet loss. After a threshold of results is received with 100% packet loss, TRAM 186 generates an alarm into the operational support system (OSS), which generates a ticket for the network operator to replace the offline server. In a first case, the operator may determine that a server is not needed at the particular location indicated by the server's IPv4 or IPv6 address. In a second case, the operator may determine that a server is needed at that particular location. In this case a new network host VTP with the same IP address is deployed at that location.

Figure 6:
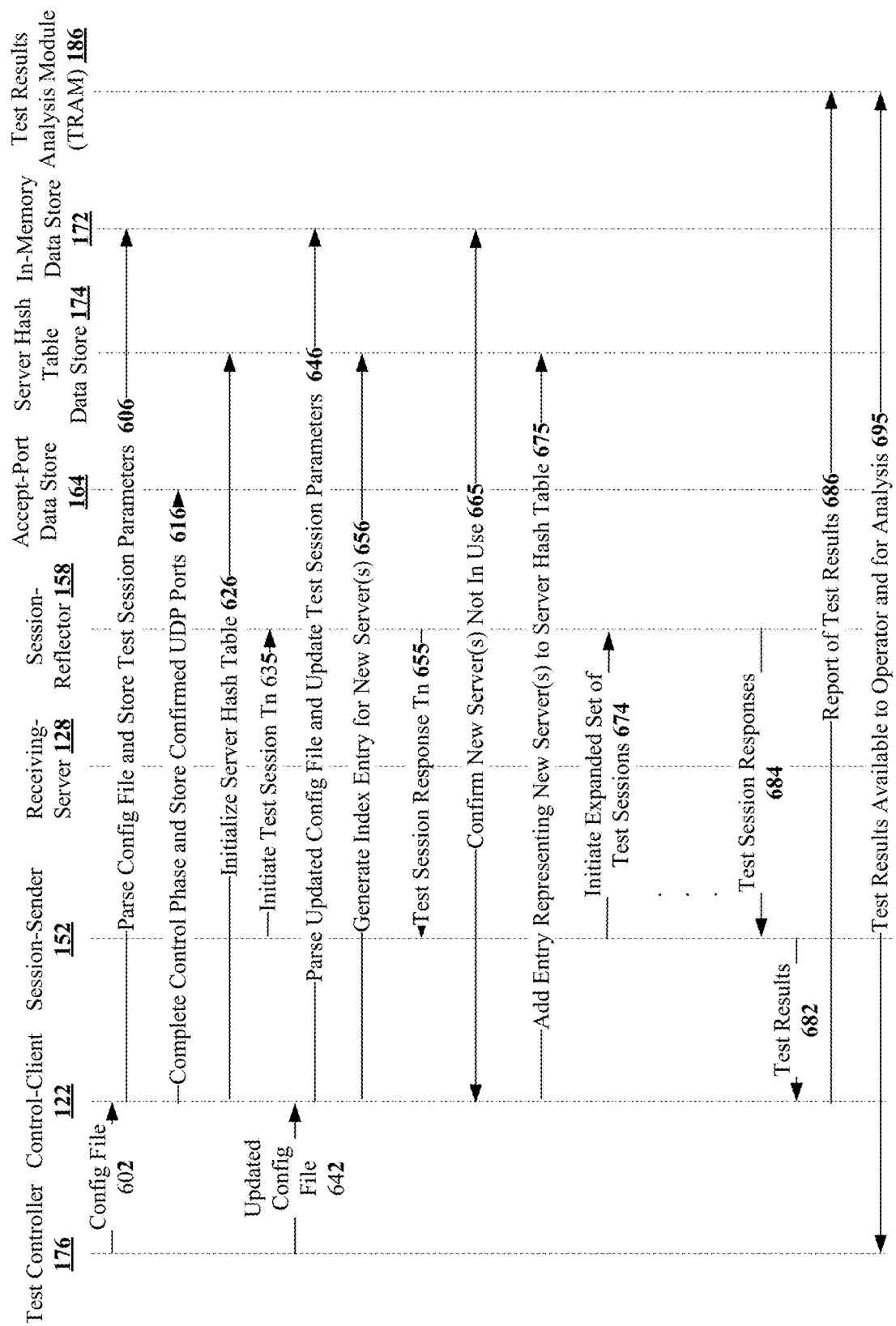
FIG. 6 shows a message flow for scalability for TWAMP with mesh network architecture.

FIG. 6 shows a series of messages for deploying servers for TWAMP testing. The operator completes the configuration file with the addressing information for the server and test controller 176 pushes config file 602 to control-client 122, which parses the config file and stores test session parameters 606 to in-memory data store 172. Control-client 122 completes the control phase for TWAMP and stores confirmed UDP ports 616 in accept-port data store 164, initializes server hash table 626 in server hash table data store 174. Session-sender 152 initiates test sessions T1 through Tn 635 to session-reflector 158 and receives tests session response T1 through Tn 655 back at session-sender 152. FIG. 6 also shows the message flow for deploying a new server. The operator updates the configuration file with the addressing information for the new or replaced server and test controller 176 pushes config file 642 to control-client 122, which parses the updated config file and updates test session parameters 646 to in-memory data store 172. Control-client 122 generates the index entry for new server 656 and stores the index in server hash table data store 174. Control-client 122 confirms that the new server is not in use 665 and adds an entry representing the new server to server hash table 675. Session-sender 152 initiates an expanded test of test sessions 674, without stopping any test sessions already in progress. Test results 682 are monitored by control-client 122 and reports of test results 686 are made available to TRAM 186. Test results are made available to the network maintenance operator and for big data analysis 695 through test controller 176. The same set of messages shown in FIG. 6 would apply when adding multiple servers for testing a mesh network.

Figure 7:
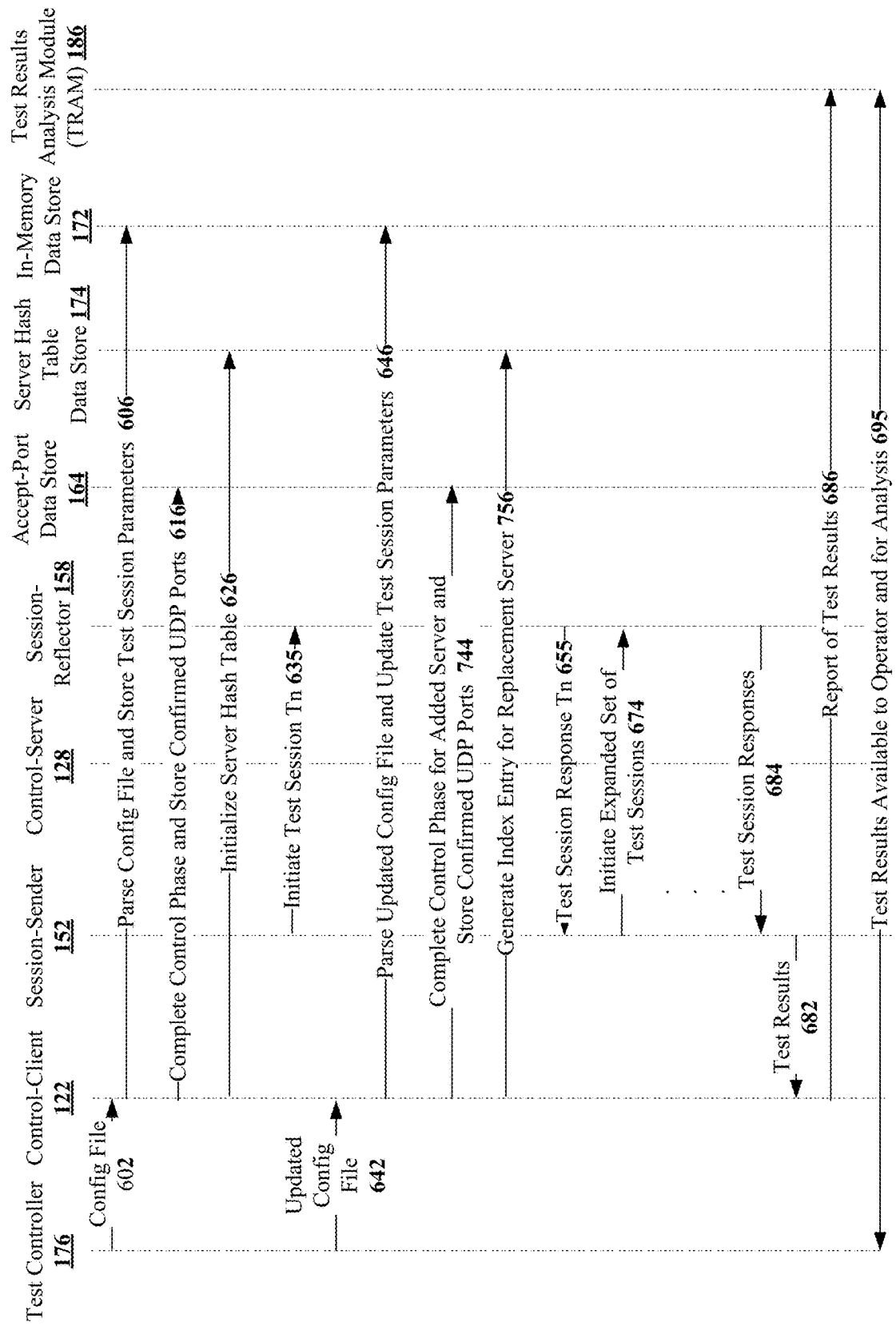
FIG. 7 shows a message flow for fault tolerance for TWAMP with mesh network architecture.

For the second case, described supra, FIG. 7 shows a message flow for adding a replacement server to ensure fault tolerance for TWAMP with mesh network architecture. Control-client 122 parses the updated config file and updates test session parameters 646 in in-memory data store 172. The control phase is initiated for the replacement server and confirmed UDP port is stored 744 in accept-port data store 164. Session-sender 152 initiates an expanded test of test sessions 674 to session-reflector 158, after control-client 122 generates the index entry for the replaced server 756.

In a third case in which a server goes offline, the network maintenance operator may determine that a server is not needed at that particular location but at a different location. In this case a new network host VTP is deployed at that location with a different IP address corresponding to that location. The operator also updates the config file with the addressing information for the replaced server. This config file is then pushed to all the control-clients, which parse the config file and initiates the control and test sessions to the new server, as shown in FIG. 6 and described supra.

Test controller 176 sends the REST API command, listed next, to start the TWAMP server, in one implementation. In this example, the TRAM endpoint is a pointer to the results repository for the client's files.

```
                curl -X POST --header 'Content-Type: application/yang-data+json' --header
'Accept: application/yang-data+json' 'http://10.32.88.27:8080/api/v2/data/vta-twamp:test-
twamp-server/server/test-sessions=TWAMP_SERVER/' -d '{
    {
        "vta-twamp:test-sessions": [
            {
                "name": "TWAMP_SERVER",
                "test-controller": {
                    "backup-controller-address": "",
                    "controller-address": "127.0.0.1",
                    "measurement-method": "template",
                    "test-group-id": "1",
                    "tram-endpoint": "http://127.0.0.1:8082/api/v2/results/1/"
                },
                "test-parameters": {
                    "control-port": 862,
                    "duration": 0,
                    "refwait": 900,
                    "servwait": 900,
                    "virtual-link": {
                        "connection-point": {
                            "ipv4": {
                                "addr": "3.3.3.40",
                                "gateway": "3.3.3.1",
                                "prefix": "3.3.3.0/24"
                            }
                        },
                        "connectivity-type": "ELINE",
                        "id": 1,
                        "root-requirement": {
                            "cbs": 100,
                            "cir": 30
                        }
                    }
                }
            }
        ]
    }
```

The client data structure is represented as follows, with per client statistics maintained by server.

```
typedef struct __twamp_client_stats
{
        uint32 ctl_pkts_rx;
        uint32 ctl_pkts_tx;
        uint32 sess_pkts_rx;
        uint32 sess_pkts_tx;
        uint16 curr_sess;
        uint16 compl_sess;
        uint16 rej_sess;
        uint16 abort_sess;
        char start_tm[32]; /* format yymmdd-hhmmss */
        char stop_tm[32]; /* format yymmdd-hhmmss */
        char init_tm[32]; /* format yymmdd-hhmmss */
        int32 client_ip;
        void *pSvr; /* hook to associated server */
} twamp_client_stats_t;
```

The control block for each TWAMP server is described next.

```
typedef struct __twamp_server_ctx
{
    int accept_sock;
    struct sockaddr sa_cl_addr;
    uint32 client_ip;
    void *pParams;
    int16_t active;
    int16_t host_route_added; /* Host route added for every client that
connects */
    int started;
    int test_status;
    pthread_t thd_id;
```

-continued

```
    int thd_cancel;
    uint32 sender_ip;
    uint32 svr_ip;
    int16_t finished;
    int16_t sess_num;
    struct ether_addr dst_eth;
    char ifname[IFNAMSIZ];
    time_t last_rx_tm;      /* Used for session inactivity check */
    uint16 ref_port[MAX_TWAMP_SESSIONS]; /* reflector port */
    char cl_str[INET_ADDRSTRLEN];
    /* Pointing to actual data in server_ctx */
    twamp_client_stats_t *pStats;
    uint8 rx_buf[MAX_TWAMP_MSG_SZ];
    uint8 tx_buf[MAX_TWAMP_MSG_SZ];
    mmap_cb_t map_cb;
} twamp_server_ctx_t;
```

The Test Controller sends a REST API command to start the TWAMP client. FIG. 16 shows an example REST API command for TWAMP client.

Figure 8:
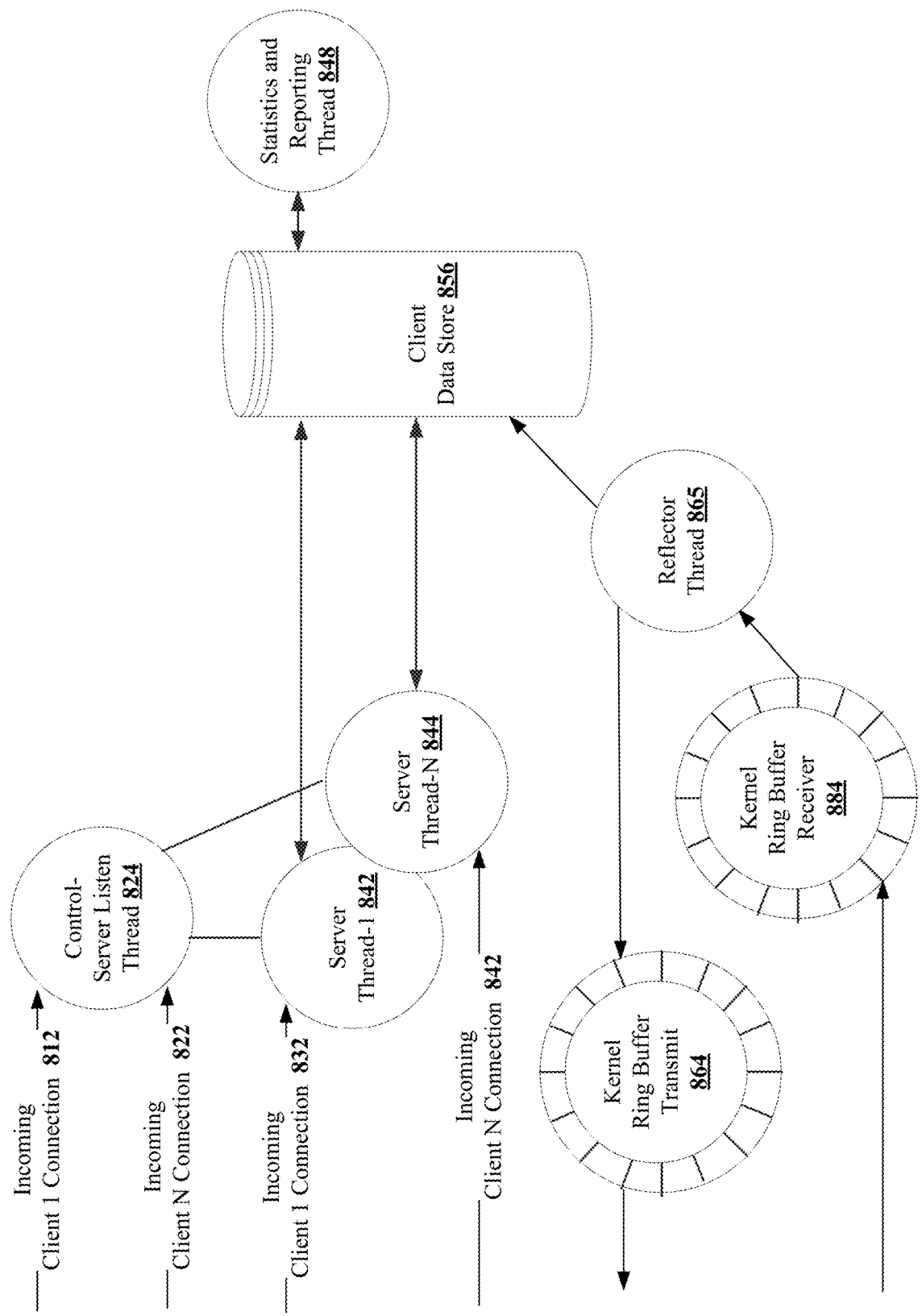
FIG. 8 shows an example of the testing flow for the TWAMP mesh network.

FIG. 8 shows an example of the testing flow for the TWAMP mesh network. The control-server listen thread 824 processes incoming client connections 812, 822 on well-known TWAMP port 862 which is defined by Internet Assigned Numbers Authority (IANA) for the TWAMP server. When client one initiates a connection 832, 842 a server thread 842, 844 is spawned to process the control-setup messages, and the listen thread continues to process incoming connections from other clients, which ensures parallelism. A client hash table is created and the client entry for the client is added to the client data store 856. The IP address of the client (4 bytes if IPv4 or 16 bytes if IPv6) is used as input into the hash function. When the control-setup for all the sessions is complete, a reflector thread 865 is spawned, which functions as the session-reflector to reflect the test packets received from the session-sender for all the sessions, via Kernel Ring Buffer Receiver 884 and Kernel Ring Transmit Buffer 864. Statistics and reporting thread 848 accesses the data stored in client data store 856 to generate statistics and report them to the TRAM.

Figure 9:
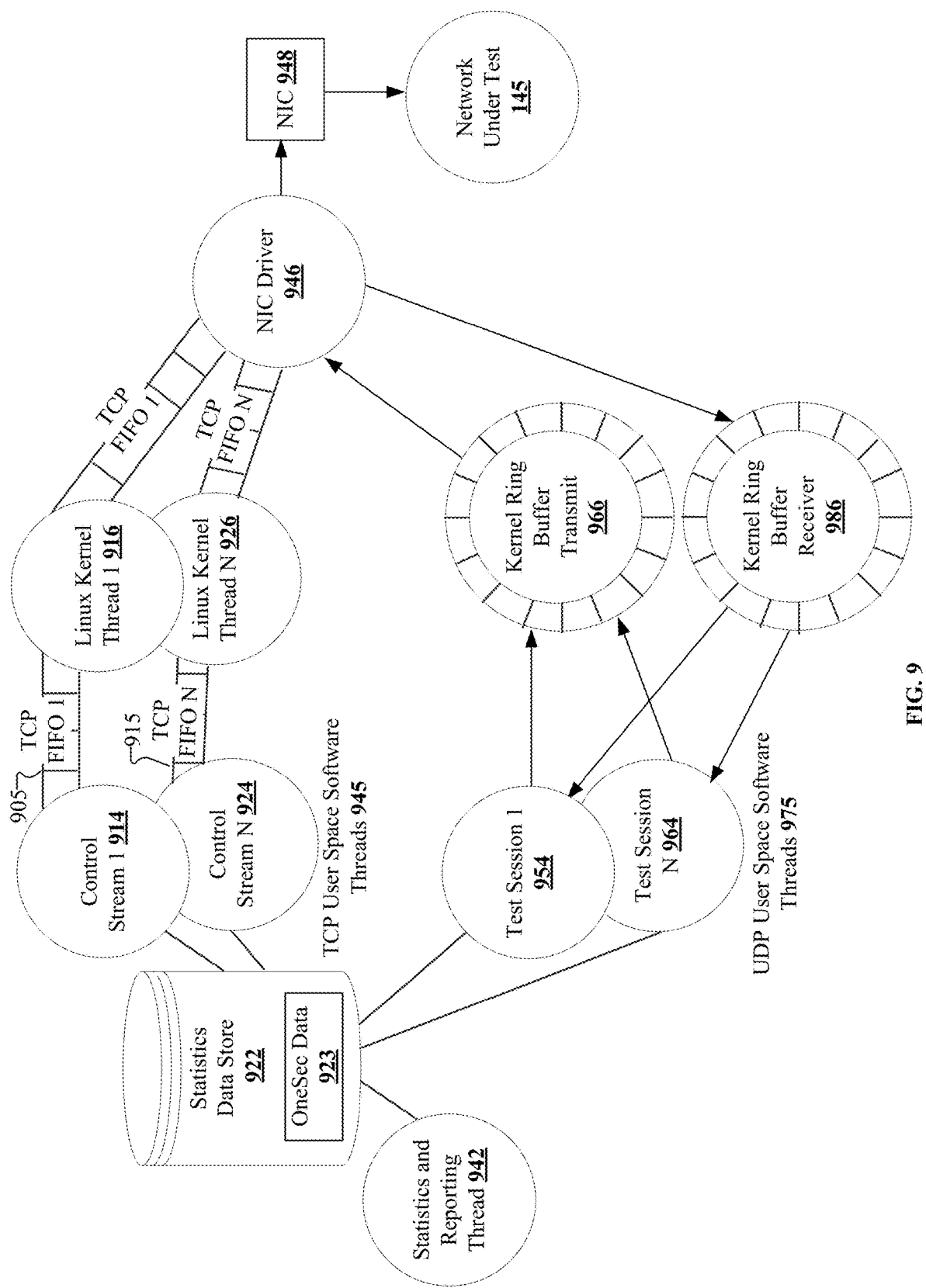
FIG. 9 shows a block diagram of an example software implementation designed as a parallel processing and distributed system with lock free access to share data.

FIG. 9 shows a block diagram of an example software implementation of the disclosed technology, to demonstrate the parallel processing and distributed system with lock free access to share data. The TCP control setup on individual control streams 914, 924 proceeds in parallel using separate FIFO queues 905, 915 per stream. The TCP user space software threads 945 communicate with the Linux Kernel software threads 916, 926 using FIFO queues 905, 915 in this implementation. The separate queues enable software level thread-ability of the processing. The queues are lock free to ensure that no blocking is introduced. The UDP test packets are transmitted and received using UDP user space software threads 975 and Kernel Ring Transmit Buffer 966 and Kernel Ring Buffer Receiver 986. This design also ensures that the processing of many dozens to thousands of test sessions can be distributed among multiple threads on a CPU. The statistics are calculated and reports are generated using statistics and reporting thread 942 that accesses the common statistics data store 922, with onesec data 923, which maintains statistics per stream and session. This strategy ensures high performance and enables introduction of processing for new streams and sessions to proceed in parallel with the existing streams and sessions, as described supra.

The stream parameters for each TWAMP test stream are listed next, with a session table for each session.

```
typedef struct_twamp_pm_stream_params
{
twamp_pm_stream_cfg_t cfg;
char interface[IFNAMSIZ];
struct ether_addr dst_eth;
int client_sock;
twamp_pm_sess_params_t *sess;   /* session table for each session */
```

The index into the server hash table is listed for each session in the example stream that follows. The accept index is the index into the accept port data store, which includes the UDP, for each test session.

```
    int16 accept_idx;   /* Accept session index - tracks sessions */
    int8 error_flag;    /* Error in control setup */
    int8 ctl_complete;  /* Session control setup success */
    uint16 num_sessions;
    uint8 num_vlans;
    int8 route_added;
} twamp_pm_stream_params_t;
```

TWAMP session parameters for each TWAMPPM test session follow.

```
        typedef struct_twamp_pm_sess_params
        {
            twamp_pm_sess_cfg_t cfg;
            uint64 next_pkt_tm;
            void *pCtx;
            void *pStrm;
            void *pStats;
        } twamp_pm_sess_params_t;
```

The TWAMP full-mesh measurement architecture is also designed to enable zero-touch network and service management. Control-clients and attendant session-senders and control-servers and attendant session-reflectors are distributed at different geographic locations of a TWAMP full-mesh measurement topology in the customer's network-under-test. If there is a power outage at a control-server location, the control-client will experience packet loss to this server. When the power is restored and the control-server is restarted by the test controller 176 after a phone home by the TWAMP server VTA. The session-reflectors are not started automatically as there is no state stored and restored across reboots by the server. Control-client 122 uses a fault management technique to automatically start testing to this rebooted server without operator intervention.

To support the zero-touch feature, a fault management software thread runs on the VTA running the TWAMP client. The fault management process proceeds as described next. The fault management thread analyzes the statistics stored in PM result data store 162 for every session. A per-session fault state variable is maintained. Also a per-server fault state variable is maintained. The states are 'initial', 'testing' and 'fault'. The state variables start in the 'initial' state. After the TWAMP control setup is complete and the TWAMP test starts, the state moves to 'testing' state. If there is packet loss on a session, the state is moved to 'fault' for that session. The server state remains in 'testing'. If the session stays in 'fault' state for a full reporting interval for all the sessions on that server, then the server state is moved to 'fault'. In one implementation, the control thread on the TWAMP client checks for the server fault state every 5 seconds. For every server in 'fault' state, the control thread stops the TWAMP test and TWAMP control to that server. The control thread then restarts the TWAMP control setup to that server. If setup is unsuccessful, an exponential back-off is used to decrease the rate of the process, to gradually find an acceptable rate, trying again after ten seconds, twenty seconds, forty seconds, and eighty seconds and so on. Once the TWAMP control setup is successful, the TWAMP test is started to the session-reflector on that server.

FIG. 11 shows message fields for a TWAMP Session-Sender test packet, for reference.

FIG. 12 shows message fields for a TWAMP Session Reflector test packet, for reference.

New KPIs

Key performance indicators (KPI) are usable by the network operator to track and correct problems in the network-under-test, for optimizing delivery of Internet protocol (IP) multimedia services over conventional, SDN and NFV network architectures. In the existing TWAMP, the KPIs that are specified are latency, jitter, lost packets and out of sequence packets. The fifteen disclosed new KPIs, described next, can significantly enhance the level of service assurance provided to network-under-test 145. The fifteen new KPIs utilize counts and are in groupings by latency, jitter and jitter latency for round trips, near trips and far trips; and by errored seconds, severely errored seconds, unavailable seconds, and unavailable enhanced seconds. Each of the new KPIs is described in detail herein. Note that this document uses the terms 'two-way' and 'round-trip' synonymously.

The thresholds for the new KPIs are specified in the configuration file per-session. The results for the KPIs are reported per session. Network operators and users work at the services level, as they look at the network-under-test as providing an end-to-end service. A TWAMP test session maps to a user level end-to-end service such as a VoIP call using Skype. The newly disclosed KPIs are specified at the session level and relate to end-to-end-services such as VoIP and IP video conferencing.

TWAMP relies on timestamps for the accurate calculation of KPIs. In the world of network time protocol (NTP), stratum levels define the distance from the reference clock. A reference clock is a stratum-0 device that is assumed to be accurate and has little or no delay associated with it. The reference clock synchronizes to the coordinated universal time (UTC) using global positioning system (GPS) transmissions, code division multiple access (CDMA) technology or other time signals. Stratum-0 servers cannot be used on the network. Instead, they are directly connected to computers which then operate as stratum-1 servers. A stratum-1 time server acts as a primary network time standard. Session-sender 152 and session-reflector 158 manage the accuracy of the timestamps used by synchronizing their local clocks with the clock of the NTP server, running at stratum level one, in one implementation.

Figure 13:
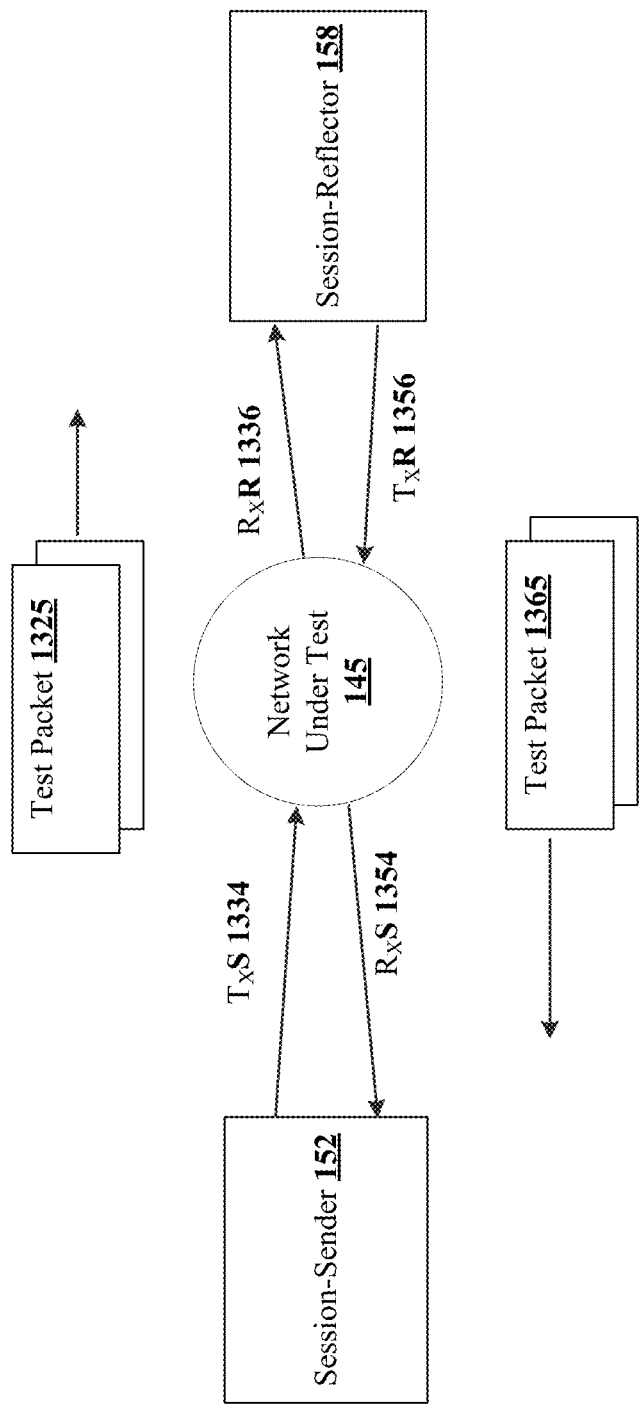
FIG. 13 shows a flow representation of test packets for a network-under-test, and the timestamps used by TWAMP.

FIG. 13 shows a flow representation of test packets for a network-under-test, and the timestamps used by TWAMP. Session-sender 152 transmits TWAMP test packets 1325 to session-reflector 158. TXS 1334 represents the transmission timestamp of the TWAMP test packet from session-sender 152. RXR 1336 represents the receive timestamp of the TWAMP test packet at the session-reflector 158. TXR 1356 represents the transmission timestamp of the reflected TWAMP test packet at session-reflector 158. RXS 1354 represents the receive timestamp of the reflected TWAMP test packet 1365 at session-sender 152. Each timestamp is represented as a four-byte integer part of seconds, followed by a four-byte fractional part of seconds. The integer part of seconds represents the seconds elapsed since Jan. 1, 1900, referred to as the epoch. The fractional part of the second represents the fraction of a second elapsed since then.

Problem patterns for the network can be detected when the disclosed new service-level KPI data gets analyzed. When problem patterns are detected, alarms can be triggered for the network operator so they can take corrective actions, which include but are not limited to increasing the bandwidth capacity of the network link between the session-sender and session-reflector, increasing the transmit and receive queue sizes of the network interface controllers (NICs) on the routers and switches on the network link, and reducing the bandwidth load on the network link.

The TWAMP statistics data structure, shown next, is used for the disclosed new KPIs.

```
typedef struct_twamp_pm_curr_stats
{
    uint64_t lat_sqrd;          /* sum of latency squared */
    uint64_t jitt_sqrd;         /* sum of jitter squared */
    uint32 curr_lat;            /* Round trip latency stats */
    uint32 curr_tot_lat;
    uint32 tot_lat;
    uint32 last_lat;            /* for jitter, last calculated latency */
    uint32 lat_cnt;             /* for current average */
    uint32 tot_lat_cnt;         /* for cumulative average */
    uint32 curr_jitt;           /* Round trip jitter stats */
    uint32 curr_tot_jitt;
    uint32 tot_jitt;
    uint32 jitt_cnt;
    uint32 tot_jitt_cnt;
    uint32 far_lat;             /* Far latency stats */
    uint32 cum_far_lat;
    uint32 tot_far_lat;
    uint32 last_far_lat;        /* for jitter, last calculated latency */
    uint32 far_lat_cnt;         /* for average */
    uint32 tot_far_lat_cnt;     /* for average */
    uint32 far_jitt;            /* Far jitter stats */
    uint32 cum_far_jitt;
    uint32 tot_far_jitt;
    uint32 far_jitt_cnt;
    uint32 tot_far_jitt_cnt;
    uint32 near_lat;            /* Near latency stats */
    uint32 cum_near_lat;
    uint32 tot_near_lat;
    uint32 last_near_lat;       /* for jitter, last calculated latency */
    uint32 near_lat_cnt;        /* for average */
    uint32 tot_near_lat_cnt;    /* for average */
    uint32 near_jitt;           /* Near jitter stats */
    uint32 cum_near_jitt;
    uint32 tot_near_jitt;
    uint32 near_jitt_cnt;
    uint32 tot_near_jitt_cnt;
    uint32 tx_seq;              /* next transmit sequence */
    uint32 rx_seq;              /* last received sequence */
} twamp_pm_curr_stats_t;
```

TWAMP availability statistics thresholds data structure, shown next, is used for disclosed new KPIs.

```
typedef struct avail_thresh {
    uint16_t ses_loss_thresh_rt;
    uint16_t ses_enh_thresh_rt;
    uint16_t uas_loss_criteria_rt;
    uint16_t uas_enh_criteria_rt;
} avail_thresh_t;
typedef struct avail_state {
    uint16_t cons_good_loss; /* consecutive seconds with no severe
    losses (ses) */
    uint16_t cons_ses_loss;  /* consecutive seconds with severe losses
    (ses) */
    /* consecutive seconds with no severe availability issues (ses,
    enhanced criteria)*/
    uint16_t cons_good_enh;
    /* consecutive seconds with severe availability issues (ses,
    enhanced criteria) */
    uint16_t cons_ses_enh;
    /* Flag (1 | 0) to indicate that loss-based unavailability window
    is open */
    uint8_t unavail_window_loss;
    /* Flag (1|0) indicate that enhanced criteria-based unavailability
    window is open*/
    uint8_t unavail_window_enh;
} avail_state_t;
typedef struct avail_results {
    /*secs in the report interval where >=1 packet was lost */
    uint16_t es_loss_rt;
    /* secs in interval where >=1 packet was {lost or latency
    exceeded threshold} */
    uint16_t es_enh_rt;
    /* secs in interval where % of packets lost exceeded threshold
    <sesLossThresh>*/
    uint16_t ses_loss_rt;
    /* secs in the interval where % packets {lost or latency
    exceeded threshold} */
    /* exceeded the threshold <sesEnhThresh> */
    uint16_t ses_enh_rt;
    /* # secs in interval counted as unavailable based in criteria
    <uasLossCriteria> */
    uint16_t uas_loss_rt;
    /* # secs in interval counted as unavailable based on criterial
    <uasEnhCriteria> */
    uint16_t uas_enh_rt;
} avail_results_t;
```

TWAMP onesec statistics thresholds data structure, shown next, is used for disclosed new KPIs.

```
typedef struct onesec_stats {
    uint32_t tx;
    uint32_t rx;
    uint32_t exc_lat;
    uint32_t exc_jitt;
    uint32_t exc_both;
} onesec_stats_t;
```

TWAMP running statistics thresholds data structure, shown next, is used for the disclosed new KPIs.

```
typedef struct_twamp_run_stats
{
    avail_results_t avail_results;    /* Results for availability calculations */
    onesec_stats_t onesec;             /* One second stats for availability calculations */
    avail_state_t avail_state;
    uint64 pkts_tx;
    uint64 pkts_rx;
    int64 pkts_lost;
    uint64 pkts_oos;
    uint32 min_lat;                    /* RTT latency in usec */
    uint32 max_lat;
    uint32 ave_lat;
    uint32 rt_exc_lat_frames;
    uint32 min_jitt;                   /* RTT jitter in usec */
    uint32 max_jitt;
    uint32 ave_jitt;
    uint32 rt_exc_jitt_frames;
    uint32 rt_exc_both_frames;
    uint32 near_min_lat;               /* Near end latency in usec */
    uint32 near_max_lat;
    uint32 near_ave_lat;
    uint32 near_min_jitt;              /* Near end jitter in usec */
    uint32 near_max_jitt;
    uint32 near_ave_jitt;
    uint32 near_exc_lat_frames;           /* Near Frames exceeding threshold */
    uint32 near_exc_jitt_frames;
    uint32 near_exc_both_frames;
    uint32 far_min_lat;                /* Far end latency in usec */
    uint32 far_max_lat;
    uint32 far_ave_lat;
    uint32 far_min_jitt;               /* Far end jitter in usec */
    uint32 far_max_jitt;
    uint32 far_ave_jitt;
    uint32 far_exc_lat_frames;            /* Far Frames exceeding threshold */
    uint32 far_exc_jitt_frames;
    uint32 far_exc_both_frames;
} twamp_run_stats_t;
```

Newly disclosed service-level KPIs, as enhancements to the KPIs in TWAMP RFC 5357, are described next.

Two-Way Latency Threshold Exceeded KPI

Tracking the number of frames that exceed a pre-determined threshold is a new KPI which provides new and important compared to the existing measurement of two-way latency, which is commonly performed in testing environments. KPI 'Two_Way_Latency_Threshold_exceeded' utilizes a 64-bit counter (rt_exc_lat_frames) that counts the number of TWAMP test packets received at the session-sender, with measured latency that exceeded the two-way latency threshold specified for the specific test session.

In one example, since the number of frames transmitted in a reporting interval is known, by comparing that number to the number of frames that exceeded the latency threshold, the operator can determine whether the number of frames that exceeded the threshold is higher than the acceptance criteria for a particular kind of application media stream, and if yes, then a determination can be made that the specific application should not be sent over the particular network path. Details for measuring the new KPI follow.

A per-session two-way latency threshold called 'latencyThreshRt' is allowed to be specified in the configuration file, described supra. Session-sender 152 fills in the fields of the TWAMP session-sender test packet, shown in FIG. 11, and the timestamp field is filled with the value TXS 1334, shown in FIG. 13. The two-way latency computation makes use of the fields of the TWAMP Session Reflector Test Packet, shown in FIG. 12 and described supra relative to FIG. 11, FIG. 12 and FIG. 13.

The approach for calculating the two-way latency threshold exceeded KPI is shown next. For every TWAMP test packet received back at the session-sender, RefTime is the time spent by the session reflector to process the test packet: RefTime=TXR−RXR. The calculation is completed via the following steps:

```
{
    curr_lat = RxS − RefTime − TxS
    if (curr_lat > latencyThreshRt)
        rt_exc_lat_frames += 1
}
```

At the end of the reporting interval, rt_exc_lat_frames value gets reported to the TRAM as part of the statistics reporting by statistics and reporting thread 942. The results can be graphed and analyzed, as described supra.

One-Way Near Latency Threshold Exceeded KPI

KPI 'One_Way_Near_Latency_Threshold_exceeded' utilizes a 64-bit counter (near_exc_lat_frames) that counts the number of TWAMP test packets received at the session-sender from the session-reflector with measured one-way latency that exceeded the one-way near latency threshold, in the direction of the network path between the session-reflector and the session-sender, for this specific test session.

A per-session one-way latency threshold called 'latencyThreshNear' is allowed to be specified in the configuration file, described supra. Session-sender 152 fills in the fields of the TWAMP session-sender test packet, shown in FIG. 11, and the timestamp field is filled with the value TXS 1334, shown in FIG. 13. The one-way near latency computation makes use of the fields of the TWAMP Session Reflector Test Packet, shown in FIG. 12 and described supra relative to FIG. 11, FIG. 12 and FIG. 13.

The approach for calculating the one-way latency threshold exceeded KPI is shown next. For every TWAMP test packet received back at the session-sender, the calculation is completed via the following steps:

```
{
    near_lat = R_xS - T_xR
    if (near_lat > latencyThreshNear)
        near_exc_lat_frames += 1
}
```

One-Way Far Latency Threshold Exceeded KPI

KPI 'One_Way_Far_Latency_Threshold_exceeded' utilizes a 64-bit counter (far_exc_lat_frames) that counts the number of TWAMP test packets received at the session-reflector from the session-sender with measured one-way latency that exceeded the one-way far latency threshold, in the direction of the network path between the session-sender and the session-reflector, for this specific test session.

A per-session one-way latency threshold called 'latencyThreshFar' is allowed to be specified in the configuration file, described supra. Session-sender 152 fills in the fields of the TWAMP session-sender test packet, shown in FIG. 11, and the timestamp field is filled with the value TXS 1334, shown in FIG. 13. The one-way far latency computation makes use of the fields of the TWAMP Session Reflector Test Packet, shown in FIG. 12 and described supra relative to FIG. 11, FIG. 12 and FIG. 13.

The approach for calculating the one-way far latency threshold exceeded KPI is shown next. For every TWAMP test packet received at the session-sender, the calculation is completed via the following steps:

```
{
    far_lat = R_xR - T_xS
    if (far_lat > latencyThreshFar)
        far_exc_lat_frames += 1
}
```

At the end of the reporting interval, the far_exc_lat_frames value gets reported to the TRAM as part of the statistics reporting by statistics and reporting thread 942. The results can be graphed and analyzed, as described supra.

Two-Way Jitter Threshold Exceeded KPI

KPI 'Two_Way_Jitter_Threshold_exceeded' utilizes a 64-bit counter (rt_exc_jitt_frames) that counts the number of TWAMP test packets received at the session-sender with measured jitter that exceeded the two-way jitter threshold specified for the specific test session. Two-way jitter is defined in RFC 3393 as the variation in the two-way latency.

A per-session two-way jitter threshold called 'jitterThreshRt' is allowed to be specified in the configuration file, described supra. Session-sender 152 fills in the fields of the TWAMP session-sender test packet, shown in FIG. 11, and the timestamp field is filled with the value TXS 1334, shown in FIG. 13. The two-way jitter threshold exceeded computation makes use of the fields of the TWAMP Session Reflector Test Packet, shown in FIG. 12 and described supra relative to FIG. 11, FIG. 12 and FIG. 13.

The approach for calculating the two-way jitter threshold exceeded KPI is shown next. Before the test is started, the variable 'last_lat' is initialized to the value INITIAL_VALUE. In practice this is set to 0xffffffff, in one implementation, because the two-way jitter can be calculated only after at least two two-way latency values have been calculated. For every TWAMP test packet received back at the session-sender, the calculation is completed via the following steps:

```
{
/* Calculate curr_lat as shown above for two-way latency. */
    If (last_lat != INITIAL_VALUE)
    {
        curr_jitt = curr_lat - last_lat;
    }
    last_lat = curr_lat;
    if (curr_jitt > jitterThreshRt)
        rt_exc_jitt_frames += 1;
}
```

At the end of the reporting interval, the rt_exc_jitt_frames value gets reported to the TRAM as part of the statistics reporting by statistics and reporting thread 942. The results can be graphed and analyzed, as described supra.

When problem patterns are detected, alarms can be triggered for the network operator so they can take corrective actions, which include but are not limited to increasing the transmit and receive de-jitter buffer sizes of the NICs on the routers and switches on the network link, in addition to potential actions listed supra. In one case, when an interactive IP video service such as a video conference or Facetime call is deployed in the network, the configuration of the de jitter buffers needs to be optimized to ensure optimum video quality at the customer premises. One calculation of the de jitter buffer size can be de-jitterbuffersize=$\alpha$*(max of jitter values for these frames) where $\alpha$ is empirically calculated for the network-under-test.

One-Way Near Jitter Threshold Exceeded KPI

KPI 'One_Way_Near_Jitter_Threshold_exceeded' utilizes a 64-bit counter (near_exc_jitt_frames) that counts the number of TWAMP test packets received at the session-sender from the session-reflector with measured one-way jitter that exceeded the one-way near jitter threshold specified for the specific test session, in the direction of the network path between the session-reflector and the session-sender. One-way near jitter is defined in RFC 3393 as the variation in the one-way near latency.

A per-session one-way near jitter threshold called 'jitterThreshNear' is allowed to be specified in the configuration file, described supra. Session-sender 152 fills in the fields of the TWAMP session-sender test packet, shown in FIG. 11, and the timestamp field is filled with the value TXS 1334, shown in FIG. 13. The two-way near jitter threshold computation makes use of the fields of the TWAMP Session Reflector Test Packet, shown in FIG. 12 and described supra relative to FIG. 11, FIG. 12 and FIG. 13.

The approach for calculating the one-way near jitter threshold exceeded KPI is shown next. Before the test is started, the variable 'near_last_lat' is initialized to the value INITIAL_VALUE. In practice this is set to 0xffffffff, in one implementation, because the one-way near jitter can be calculated only after at least two one-way near latency values have been calculated. For every TWAMP test packet received back at the session-sender, the calculation is completed via the following steps:

```
{
    /* Calculate near_lat as shown above for one-way near latency. */
    If (near_last_lat != INITIAL_VALUE)
    {
        near_jitt = near_lat – near_last_lat;
    }
        near_last_lat = near_lat;
        if (near_jitt > jitterThreshNear)
            near_exc_jitt_frames += 1;
}
```

One-Way Far Jitter Threshold Exceeded KPI

KPI 'One_Way_Far_Jitter_Threshold_exceeded' utilizes a 64-bit counter (far_exc_jitt_frames) that counts the number of TWAMP test packets received at the session-sender from the session-reflector with measured one-way jitter that exceeded the one-way far jitter threshold specified for the specific test session, in the direction of the network path between the session-reflector and the session-sender. One-way far jitter is defined in RFC 3393 as the variation in the one-way far latency.

A per-session one-way far jitter threshold called 'jitterThreshFar' is allowed to be specified in the configuration file, described supra. Session-sender 152 fills in the fields of the TWAMP session-sender test packet, shown in FIG. 11, and the timestamp field is filled with the value TXS 1334, shown in FIG. 13. The one-way far jitter threshold exceeded computation makes use of the fields of the TWAMP Session Reflector Test Packet, shown in FIG. 12 and described supra relative to FIG. 11, FIG. 12 and FIG. 13.

The approach for calculating the one-way far jitter threshold exceeded KPI is shown next. Before the test is started, the variable 'far_last_lat' is initialized to the value INITIAL_ VALUE. In practice this is set to 0xffffffff, in one implementation, because the one-way far jitter can be calculated only after at least two one-way far latency values have been calculated. For every TWAMP test packet received back at the session-sender, the calculation is completed via the following steps:

```
{
    /* Calculate far_lat as shown supra for one-way far latency. */
    If (far_last_lat != INITIAL_VALUE)
    {
        far_jitt = far_lat – far_last_lat;
    }
        far_last_lat = far_lat;
        if (far_jitt > jitterThreshFar)
            far_exc_jitt_frames += 1;
}
```

At the end of the reporting interval, the far_exc_jitt_frames value gets reported to the TRAM as part of the statistics reporting by statistics and reporting thread 942. The results can be graphed and analyzed, as described supra.

When problem patterns are detected, alarms can be triggered for the network operator so they can take corrective actions, with examples listed supra. In one example, when a VoIP service such as Skype is deployed in the network, the configuration of the de-jitter buffers needs to be optimized to ensure optimum voice quality at the customer premises. The de-jitter buffer size can be specified as described supra for two-way jitter exceeded.

Two-Way Latency Jitter Threshold Exceeded KPI

KPI 'Two_Way_Latency_Jitter_Threshold_exceeded' utilizes a 64-bit counter (rt_exc_both_frames) that counts the number of TWAMP test packets received at the session-sender with both measured latency that exceeded the two-way latency threshold and measured jitter that exceeded the two-way jitter threshold specified for a particular test session. Two-way jitter is defined in RFC 3393 as the variation in the two-way latency.

A per-session two-way jitter threshold called 'jitterThreshRt' and a per-session two-way latency threshold called 'latencyThreshRt' are allowed to be specified in the configuration file, described supra. Session-sender 152 fills in the fields of the TWAMP session-sender test packet, shown in FIG. 11, and the timestamp field is filled with the value TXS 1334, shown in FIG. 13.

The two-way latency jitter threshold exceeded computation makes use of the following fields of the TWAMP Session Reflector Test Packet, shown in FIG. 12. When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

The approach for calculating the two-way latency jitter threshold exceeded KPI is shown next. Before the test is started, the variable 'last_lat' is initialized to the value INITIAL_VALUE. In practice this is set to 0xffffffff, in one implementation, because the two-way jitter can be calculated only after at least two two-way latency values have been calculated. For every TWAMP test packet received back at the session-sender, the calculation is completed via the following steps:

```
{
    /* Calculate curr_lat as shown above for two-way latency. */
    If (last_lat != INITIAL_VALUE)
    {
        curr_jitt = curr_lat – last_lat;
    }
        last_lat = curr_lat;
        if ((curr_jitt > jitterThreshRt) && (curr_lat >
            latencyThreshRt))
    rt_exc_both_frames += 1;
}
```

At the end of the reporting interval, rt_exc_both_frames value gets reported to the TRAM as part of the statistics reporting by statistics and reporting thread 942. The results can be graphed and analyzed, as described supra. When problem patterns are detected, alarms can be triggered for the network operator so they can take corrective actions, listed supra.

One-Way Near Latency Jitter Threshold Exceeded KPI

The one-way near latency jitter threshold exceeded KPI is the number of TWAMP test packets with both measured one-directional network jitter of the test packet and measured one-directional network latency of the test packet, in the direction of the network path between the session-reflector and the session-sender, that exceeded the threshold. KPI 'One_Way_Near_Latency_Jitter_Threshold_exceeded' utilizes a 64-bit counter (near_exc_both_frames) that counts the number of TWAMP test packets received at the session-sender from the session-reflector with both measured one-way jitter that exceeded the one-way near jitter threshold specified for the specific test session, and measured one-way latency that exceeded the one-way near jitter threshold specified for the specific test session in the direction of the network path between the session-reflector and the session-sender.

A per-session one-way near jitter threshold called 'jitterThreshNear' and a per-session one-way near latency threshold called 'latencyThreshNear' are allowed to be specified in the configuration file, described supra. Session-sender 152 fills in the fields of the TWAMP session-sender test packet, shown in FIG. 11, and the timestamp field is filled with the value TXS 1334, shown in FIG. 13.

The one-way near latency jitter threshold exceeded computation makes use of the following fields of the TWAMP Session Reflector Test Packet, shown in FIG. 12. When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

The approach for calculating the one-way near jitter threshold exceeded KPI is shown next. Before the test is started, the variable 'near_last_lat' is initialized to the value INITIAL_VALUE. In practice this is set to 0xffffffff, in one implementation, because the one-way near jitter can be calculated only after at least two one-way near latency values have been calculated. For every TWAMP test packet received back at the session-sender, the calculation is completed via the following steps:

```
{
/* Calculate near_lat as shown above for one-way near latency. */
    If (near_last_lat != INITIAL_VALUE)
    {
        near_jitt = near_lat - near_last_lat;
    }
    near_last_lat = near_lat;
    if ((near_jitt > jitterThreshNear) && (near_lat >
    latencyThreshNear))
        near_exc_both_frames += 1;
}
```

At the end of the reporting interval, the near_exc_both_frames value gets reported to the TRAM as part of the statistics reporting by statistics and reporting thread 942. The results can be graphed and analyzed, and when problem patterns are detected, alarms can be triggered for the network operator so they can take corrective actions, described supra.

One-Way Far Latency Jitter Threshold Exceeded KPI

KPI 'One_Way_Far_Latency_Jitter_Threshold_exceeded' utilizes a 64-bit counter (far_exc_both_frames) that counts the number of TWAMP test packets received at the session-sender from the session-reflector with both measured one-way jitter that exceeded the one-way far jitter threshold specified for the specific test session, and measured one-way latency that exceeded the one-way far latency threshold specified for the specific test session in the direction of the network path between the session-reflector and the session-sender.

A per-session one-way far jitter threshold called 'jitterThreshFar' and a per-session one-way far latency threshold called 'latencyThreshFar' are allowed to be specified in the configuration file, described supra. Session-sender 152 fills in the fields of the TWAMP session-sender test packet, shown in FIG. 11, and the timestamp field is filled with the value TXS 1334, shown in FIG. 13.

The one-way far latency jitter threshold exceeded computation makes use of the following fields of the TWAMP Session Reflector Test Packet, shown in FIG. 12. When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

The approach for calculating the one-way far latency jitter threshold exceeded KPI is shown next. Before the test is started, the variable 'far_last_lat' is initialized to the value INITIAL_VALUE. In practice this is set to 0xffffffff, in one implementation, because the one-way far jitter can be calculated only after at least two one-way far latency values have been calculated. For every TWAMP test packet received back at the session-sender, the calculation is completed via the following steps:

```
{
    /* Calculate far_lat as shown supra for one-way near latency. */
    If (far_last_lat != INITIAL_VALUE)
    {
        far_jitt = far_lat - far_last_lat;
    }
    far_last_lat = far_lat;
    if ((far_jitt > jitterThreshFar) && (far_lat > lathencyThreshFar))
        far_exc_both_frames += 1;
}
```

At the end of the reporting interval, the far_exc_both_frames value gets reported to the TRAM as part of the statistics reporting by statistics and reporting thread 942. The results can be graphed and analyzed, and when problem patterns are detected, alarms can be triggered for the network operator so they can take corrective actions, with examples listed supra.

Errored Secs from Loss KPI

New KPI 'Errored_Secs_from_Loss' utilizes a 32-bit counter (es_loss_rt) that counts the total number of seconds in the reporting interval with at least one TWAMP test frame lost, measured at the session-sender (round trip loss).

Session-sender 152 fills in the fields of the TWAMP session-sender test packet, shown in FIG. 11, and the timestamp field is filled with the value TXS 1334, shown in FIG. 13.

The errored secs from loss computation uses the following fields of the TWAMP Session Reflector Test Packet, shown in FIG. 12. When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

After a wait timeout 'tmo' 1658, which is specified at the beginning of the test session and is specific to the network-under-test has expired and the session-sender has not received the TWAMP test packet then it is marked as lost. FIG. 16 shows an example REST API command for TWAMP client, which includes the wait timeout.

Statistics and reporting thread 942 includes a 'Transmit Onesec' software thread that accesses the common statistics data store 922, which maintains statistics per stream and session; updates onesec data 923, which is populated based on the onesec_stats data structure shown supra; and increments a onesec.tx counter whenever a packet is transmitted for a specific test session. Statistics and reporting thread 942 also includes a 'Receive Onesec' software thread that accesses the common statistics data store 922 and updates onesec data 923; and increments onesec.rx counter whenever a packet is received within the timeout value, for a specific test session. Statistics and reporting thread 942 also includes an 'Availability Stats' software thread runs every second and uses the values stored in onesec data 923 to calculate the errored seconds from loss, as shown next.

```
{
lost = onesec.tx − onesec.rx
if (lost > 0)
        es_loss_rt += 1;
}
```

At the end of the reporting interval, the es_loss_rt value gets reported to the TRAM as part of the statistics reporting by statistics and reporting thread 942. The results can be graphed and analyzed, as described supra.

When problem patterns are detected, alarms can be triggered for the network operator so they can take corrective actions, listed supra. In one example, when an HTTP service such as web browsing is deployed in the network, frame losses can lead to retransmissions which can cascade and cause network congestion. Tracking the errored sessions from loss KPI and fixing related network issues can substantially improve the user's quality of experience while using the network.

Severely Errored Secs from Loss KPI

New KPI 'Severely_Errored_Secs_from_Loss' utilizes a 32-bit counter named sess_loss_rt that counts the total number of seconds in the reporting interval that lost a percentage of TWAMP test frames greater than the severely-errored-secs threshold for the specific test session, measured at the session-sender (round trip loss).

A per-session severely-errored-secs-from-loss threshold called 'sesLossThreshRt' is allowed to be specified in the configuration file, described supra. The severely errored secs from loss computation uses the following fields of the TWAMP Session Reflector Test Packet, shown in FIG. 12. Session-sender 152 fills in the fields of the TWAMP session-sender test packet, shown in FIG. 11, and the timestamp field is filled with the value TXS 1334, shown in FIG. 13.

When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

After a wait timeout 'tmo' 1658, which is specified at the beginning of the test session and is specific to the network-under-test has expired and the session-sender has not received the TWAMP test packet then it is marked as lost. FIG. 16 shows an example REST API command for TWAMP client, which includes the wait timeout.

Statistics and reporting thread 942 includes a 'Transmit Onesec' software thread that accesses the common statistics data store 922, which maintains statistics per stream and session; updates onesec data 923, which is populated based on the onesec_stats data structure shown supra; and increments a onesec.tx counter whenever a packet is transmitted for a specific test session. Statistics and reporting thread 942 also includes a 'Receive Onesec' software thread that accesses the common statistics data store 922 and updates onesec data 923; and increments onesec.rx counter whenever a packet is received within the timeout value, for a specific test session. Statistics and reporting thread 942 also includes an 'Availability Stats' software thread runs every second and uses the values stored in onesec data 923 to calculate the errored seconds from loss, as shown next.

```
{
lost = onesec.tx − onesec.rx
if (lost > 0)
{
es_loss_rt += 1;
if (lost * 100 > tx * sessLossThreshRt)
{
    ses_loss_rt += 1;
}
}
}
```

At the end of the reporting interval, the ses_loss_rt value gets reported to the TRAM as part of the statistics reporting by statistics and reporting thread 942. The results can be graphed and analyzed, and when problem patterns are detected, alarms can be triggered for the network operator so they can take corrective actions, listed supra.

Errored Secs Enhanced KPI

New KPI 'Errored_Secs_Enhanced' utilizes a 32-bit counter named es_enh_rt that counts the total number of seconds in the reporting interval that experienced a TWAMP test frame lost, or a test frame that exceeded the two-way latency threshold, or a frame that exceeded the two-way jitter threshold for this specific test session measured at the session-sender (round trip loss).

Per-session two-way jitter threshold called 'jitterThreshRt' and two-way latency threshold called latencyThreshRf are allowed to be specified in the configuration file, described supra. Session-sender 152 fills in the fields of the TWAMP session-sender test packet, shown in FIG. 11, and the timestamp field is filled with the value TXS 1334, shown in FIG. 13.

The errored secs enhanced computation uses the following fields of the TWAMP Session Reflector Test Packet, shown in FIG. 12. When the session-reflector receives the test packet for a session, it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

After a wait timeout 'tmo' 1658, which is specified at the beginning of the test session and is specific to the network-under-test has expired and the session-sender has not received the TWAMP test packet then it is marked as lost. FIG. 16 shows an example REST API command for TWAMP client, which includes the wait timeout.

The errored seconds enhanced KPI is calculated as shown next, for every TWAMP test packet received back at the session-sender, where RefTime is the time spent by the session-reflector to process the test packet: RefTime=TXR−RXR.

```
{
   curr_lat = R_xS − RefTime − T_xS
   if (curr_lat > latencyThreshRt)
      onesec.exc_lat_frames += 1
}
```

The approach for calculating the two-way jitter threshold exceeded onesec.exc_jitt_frames is as follows. Before the test is started, the variable 'last_lat' is initialized to the value INITIAL_VALUE. In practice this is set to 0xffffffff, in one implementation, because the two-way jitter can be calculated only after at least two two-way latency values have been calculated. For every TWAMP test packet received back at the session-sender, the calculation is completed via the following steps:

```
{
   Calculate curr_lat as shown above for Two-Way Latency
   If (last_lat != INITIAL_VALUE)
   {
      curr_jitt = curr_lat − last_lat;
   }
   last_lat = curr_lat;
   if (curr_jitt > jitterThreshRt)
      onesec.exc_jitt_frames += 1;
}
```

The approach for calculating the two-way latency jitter threshold exceeded onesec.exc_both_frames is as follows. Before the test is started, the variable 'last_lat' is initialized to the value INITIAL_VALUE, as described supra. For every TWAMP test packet received back at the session-sender, the calculation is completed via the following steps:

```
{
   Calculate curr_lat as shown above for Two-Way Latency
   If (last_lat != INITIAL_VALUE)
   {
      curr_jitt = curr_lat − last_lat;
   }
   last_lat = curr_lat;
   if ((curr_jitt > jitterThreshRt) && (curr_lat > latencyThreshRt))
      onesec.exc_both_frames += 1;
}
```

Statistics and reporting thread 942 includes a 'Transmit Onesec' software thread that accesses the common statistics data store 922, which maintains statistics per stream and session; updates onesec data 923, which is populated based on the onesec stats data structure shown supra; and increments a onesec.tx counter whenever a packet is transmitted for a specific test session. Statistics and reporting thread 942 also includes a 'Receive Onesec' software thread that accesses the common statistics data store 922 and updates onesec data 923; and increments onesec.rx counter whenever a packet is received within the timeout value, for a specific test session. Statistics and reporting thread 942 also includes an 'Availability Stats' software thread runs every second and uses the values stored in onesec data 923 to calculate the errored seconds enhanced, as shown next.

```
{
lost = onesec.tx − onesec.rx
enh_violations = onesec.exc_lat_frames + onesec.exc_jitt_frames −
onesec.exc_both_frames + lost;
if (enh_violations > 0)
      es_enh_rt += 1;
}
```

At the end of the reporting interval, the es_enh_rt value gets reported to the TRAM as part of the statistics reporting by statistics and reporting thread 942. The results can be graphed and analyzed, and when problem patterns are detected, alarms can be triggered for the network operator so they can take corrective actions, listed supra.

Severely Errored Secs Enhanced KPI

New KPI 'Severely_Errored_Secs_Enhanced' utilizes a 32-bit counter named ses_enh_rt that counts the total number of seconds in the reporting interval in which the percentage of TWAMP test frames that were lost (round trip loss) or exceeded the latency threshold also exceeded the severely_errored_secs_enhanced_threshold for this specific test session, measured at the session-sender.

A per-session severely errored secs enhanced threshold called 'sesEnhThreshRt' and a per-session two-way latency threshold called 'latencyThreshRt' are allowed to be specified in the configuration file, described supra. The severely errored secs enhanced computation uses the following fields of the TWAMP Session Reflector Test Packet, shown in FIG. 12. Session-sender 152 fills in the fields of the TWAMP session-sender test packet, shown in FIG. 11, and the timestamp field is filled with the value TXS 1334, shown in FIG. 13. When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13. After a wait timeout, which is specified at the beginning of the test session and is specific to the network-under-test has expired and the session-sender has not received the TWAMP test packet then it is marked as lost.

The severely errored seconds enhanced KPI is calculated as shown next, for every TWAMP test packet received back at the session-sender, where RefTime is the time spent by the session-reflector to process the test packet: RefTime=TXR−RXR.

```
{
   curr_lat = R_xS − RefTime − T_xS
   if (curr_lat > latencyThreshRt)
      onesec.exc_lat_frames += 1
}
```

The approach for calculating the two-way jitter threshold exceeded onesec.exc_jitt_frames is as follows. Before the test is started, the variable 'last_lat' is initialized to the value INITIAL_VALUE. In practice this is set to 0xffffffff, in one implementation, because the two-way jitter can be calculated only after at least two two-way latency values have been calculated. For every TWAMP test packet received back at the session-sender, the calculation is completed via the following steps:

```
{
    Calculate curr_lat as shown above for Two-Way Latency
    If (last_lat != INITIAL_VALUE)
    {
      curr_jitt = curr_lat - last_lat;
    }
    last_lat = curr_lat;
    if (curr_jitt > jitterThreshRt)
            onesec.exc_jitt_frames += 1;
}
```

The approach for calculating the two-way latency jitter threshold exceeded onesec.exc_both_frames is as follows. Before the test is started, the variable 'last_lat' is initialized to the value INITIAL_VALUE, as described supra. For every TWAMP test packet received back at the session-sender, the calculation is completed via the following steps:

```
{
    Calculate curr_lat as shown above for Two-Way Latency
    If (last_lat != INITIAL_VALUE)
    {
      curr_jitt = curr_lat - last_lat;
    }
    last_lat = curr_lat;
    if ((curr_jitt > jitterThreshRt) && (curr_lat > latencyThreshRt))
  onesec.exc_both_frames += 1;
}
```

Statistics and reporting thread 942 includes a 'Transmit Onesec' software thread that accesses the common statistics data store 922, which maintains statistics per stream and session; updates onesec data 923, which is populated based on the onesec_stats data structure shown supra; and increments a onesec.tx counter whenever a packet is transmitted for a specific test session. Statistics and reporting thread 942 also includes a 'Receive Onesec' software thread that accesses the common statistics data store 922 and updates onesec data 923; and increments onesec.rx counter whenever a packet is received within the timeout value, for a specific test session. Statistics and reporting thread 942 also includes an 'Availability Stats' software thread runs every second and uses the values stored in onesec data 923 to calculate the severely errored seconds enhanced, as shown next.

```
{
lost = onesec.tx - onesec.rx
enh_violations = onesec.exc_lat_frames + onesec.exc_jitt_frames -
onesec.exc_both_frames + lost;
if (enh_violations > 0)
{
   if (enh_violations * 100 > tx > sessEnhThreshRt)
ses_enh_rt += 1;
}
```

At the end of the reporting interval, the ses_enh_rt value gets reported to the TRAM as part of the statistics reporting by statistics and reporting thread 942. The results can be graphed and analyzed, and when problem patterns are detected, alarms can be triggered for the network operator so they can take corrective actions, listed supra.

Unavailable Seconds Overview

Two metrics for measuring unavailable seconds, described next, differ from the errored-seconds KPI counterparts described supra. The approach to calculating seconds of loss is shared by the 'unavailable seconds loss' and the 'unavailable seconds enhanced' metrics.

Using their respective input threshold criteria, unavailable seconds loss criteria (round trip) 'uasLossCriteriaRt' and unavailable seconds enhanced criteria (round trip) 'uasEnhCriteriaRt' are allowed to be specified in the configuration file, described supra. All seconds are counted as unavailable if a consecutive number of severely errored seconds meets the criteria. That is, if a consecutive block of severely errored seconds reaches the respective criteria, the state changes to an 'unavailable window' open state, where all seconds—including good seconds, also get counted as unavailable, starting at the beginning of the block. If and when a same number of consecutive seconds passes with no severely errored instances, the state changes to 'window end' and the counting of unavailable seconds ends. Like the start of counting, the end occurs at the beginning of the qualifying block.

Figure 14:
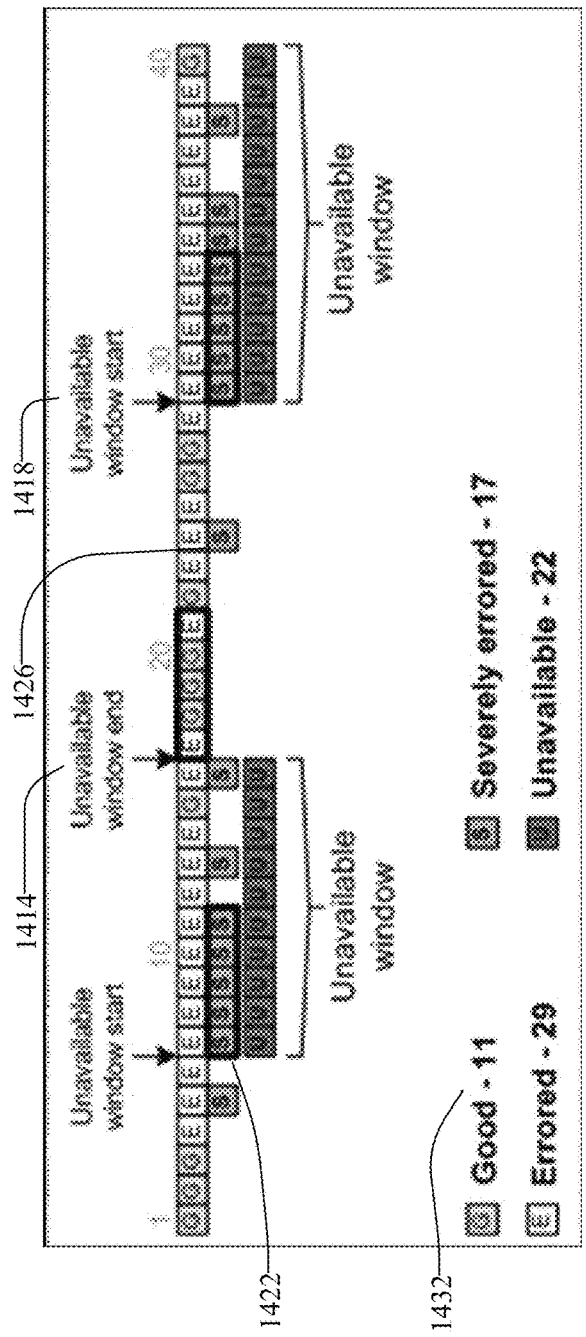
FIG. 14 shows an example report segment for an example test result with a block of severely errored seconds.
Figure 15:
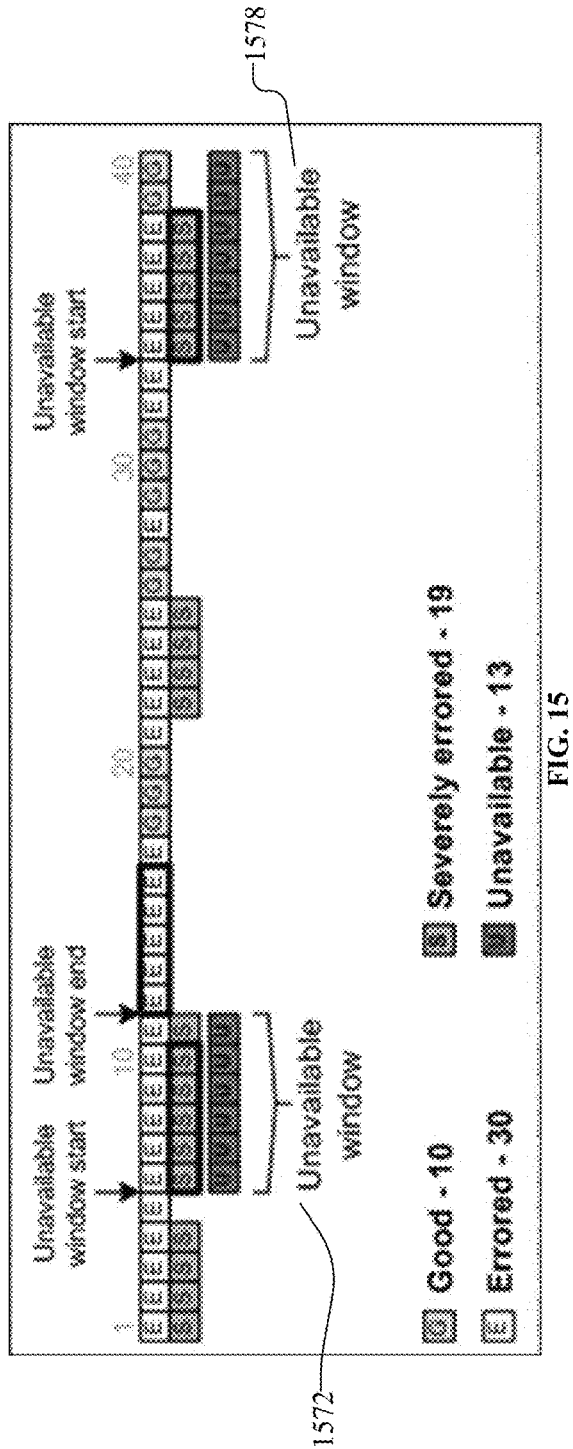
FIG. 15 shows a second example report segment in which the unavailable window starts after five errored seconds.

FIG. 14 and FIG. 15 show two example report segments that each diagram a forty-second test interval, with each second labeled to reflect the evaluated test results. In these examples, the 'unavailable' criteria is set to five seconds. FIG. 14 shows an example report segment with a block of five consecutive severely errored seconds beginning at second seven 1422. Therefore, all seconds are counted as unavailable at the beginning of the block. This behavior ends at second seventeen 1414, because it is the beginning of five consecutive non-severely errored seconds. At second twenty-four, a single severely errored second 1426 occurred, but was insufficient to transition to 'unavailable window' state. However, at second twenty-nine 1418, the reporting interval did enter a second unavailable window state and stayed there until the end. Note that all 'good' seconds are reflected in the 'good' count 1432, even those that occurred within an unavailable window. FIG. 15 shows a second example report segment using the same criteria. The unavailable window starts after five errored seconds. Again, the unavailable window blocks 1572, 1578 begin at the beginning of the block of severe-errored seconds, because there is a block of five or more severely-errored seconds.

Unavailable Secs from Loss KPI

Unavailable Secs from Loss KPI is related to loss windows that start with consecutive seconds of severe packet loss and end after consecutive seconds without severe loss. Time is divided into seconds. KPI 'Unavailable Sec From Loss' utilizes a 32-bit counter (uas_loss_rt) that counts the total number of seconds that occurred within an unavailable seconds, from TWAMP test frame loss window, with respect to the 'unavailable secs loss threshold', for this specific test session measured at the session-sender.

A per-session unavailable secs loss threshold called 'uasLossCriteriaRt' and a per-session severely errored secs enhanced threshold called 'sesEnhThreshRt' are allowed to be specified in the configuration file, described supra. The unavailable secs from loss computation uses the following fields of the TWAMP Session Reflector Test Packet, shown in FIG. 12. Session-sender 152 fills in the fields of the TWAMP session-sender test packet, shown in FIG. 11, and the timestamp field is filled with the value TXS 1334, shown in FIG. 13. When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

After a wait timeout 'tmo' 1658, which is specified at the beginning of the test session and is specific to the network-under-test has expired and the session-sender has not received the TWAMP test packet then it is marked as lost. FIG. 16 shows an example REST API command for TWAMP client, which includes the wait timeout.

Statistics and reporting thread 942 includes a 'Transmit Onesec' software thread that accesses the common statistics data store 922, which maintains statistics per stream and session; updates onesec data 923, which is populated based on the onesec_stats data structure shown supra; and increments a onesec.tx counter whenever a packet is transmitted for a specific test session. Statistics and reporting thread 942 also includes a 'Receive Onesec' software thread that accesses the common statistics data store 922 and updates onesec data 923; and increments onesec.rx counter whenever a packet is received within the timeout value, for a specific test session. Statistics and reporting thread 942 also includes an 'Availability Stats' software thread runs every second and uses the values stored in onesec data 923 to calculate the unavailable secs from loss, as shown next.

```
{
lost = onesec.tx - onesec.rx;
if (state == unavail_window_loss)
    uas_loss_rt += 1;
if (lost > 0)
{
    if (lost * 100 > tx * sessLossThreshRt)
    {
        // Severely Errored Seconds
        cons_good_loss = 0;
        cons_ses_loss += 1;
        if (state != unavail_window_loss && cons_ses_loss ==
        uasLossCriteriaRt)
        {
            // When window activates, a number of ses become uas.
            uas_loss_rt += uasLossCriteriaRt;
            state = unavail_window_loss;
        }
    }
    else
    {
        cons_ses_loss = 0; // Errored Seconds only
        cons_good_loss += 1;
        if (state == unavail_window_loss &&
            (cons_good_loss == uasLossCriteriaRt))
        {
            // When window de-activates, too many uas have been
            counted.
            uas_loss_rt -= uasLossCriteriaRt;
            state = 0;
        }
    }
}
else
{
    cons_ses_loss = 0;      // Good frame
    cons_good_loss += 1;
    if (state = unavail_window_loss &&
        (cons_good_loss >= uasLossCriteriaRt))
    {
        // When window de-activates, too many uas have been counted.
        uas_loss_rt -= uasLossCriteriaRt;
        state = 0;
    }
}
}
```

At the end of the reporting interval, the ses_enh_rt value gets reported to the TRAM as part of the statistics reporting by statistics and reporting thread 942. The results can be graphed and analyzed, and when problem patterns are detected, alarms can be triggered for the network operator so they can take corrective actions, listed supra.

Unavailable Secs Enhanced KPI

KPI 'Unavailable_Secs_enhanced' utilizes a 32-bit counter (uas_enh_rt) that counts the total number of seconds that occurred within an unavailable enhanced window with respect to the 'unavailable secs enhanced threshold'. The unavailable enhanced window takes into account both the latency threshold and the jitter threshold (round-trip) for the specific test session measured at the session-sender.

A per-session unavailable secs enhanced_threshold called 'uasEnhCriteriaRt', a per-session severely errored secs enhanced threshold called 'sesEnhThreshRt', a per-session two-way jitter threshold called 'jitterThreshRt', and a two-way latency threshold called latencyThreshRf are allowed to be specified in the configuration file, described supra. Session-sender 152 fills in the fields of the TWAMP session-sender test packet, shown in FIG. 11, and the timestamp field is filled with the value TXS 1334, shown in FIG. 13.

The unavailable secs enhanced computation uses the following fields of the TWAMP Session Reflector Test Packet, shown in FIG. 12. When the session-reflector receives the test packet for a session it reflects it back to the session-sender after filling in the fields: the timestamp field is filled with TXR 1356 the transmission timestamp of the reflected TWAMP test packet at session-reflector 158 shown in FIG. 13; the sender timestamp field is filled with the transmission timestamp value received from the session-sender TXS 1334; and the receive timestamp field is filled with the timestamp for when the test packet was received from the session-sender which is RXR 1336, also shown in FIG. 13.

After a wait timeout 'tmo' 1658, which is specified at the beginning of the test session and is specific to the network-under-test has expired and the session-sender has not received the TWAMP test packet then it is marked as lost. FIG. 16 shows an example REST API command for TWAMP client, which includes the wait timeout.

Statistics and reporting thread 942 includes a 'Transmit Onesec' software thread that accesses the common statistics data store 922, which maintains statistics per stream and session; updates onesec data 923, which is populated based on the onesec_stats data structure shown supra; and increments a onesec.tx counter whenever a packet is transmitted for a specific test session. Statistics and reporting thread 942 also includes a 'Receive Onesec' software thread that accesses the common statistics data store 922 and updates onesec data 923; and increments onesec.rx counter whenever a packet is received within the timeout value, for a specific test session. Statistics and reporting thread 942 also includes an 'Availability Stats' software thread runs every second and uses the values stored in onesec data 923 to calculate the unavailable seconds enhanced—the count of the total number of seconds that occurred within an unavailable enhanced window with respect to the 'unavailable secs enhanced threshold', as shown next.

```
{
lost = onesec.tx − onesec.rx;
enh_violations = onesec.exc_lat_frames + onesec.exc_jitt_frames −
onesec.exc_both_frames + lost;
/* State-machine for enhanced criteria-based availability count */
if (state == unavail_window_enh)
{
   uas_enh_rt += 1;
}
if (enh_violations > 0)
{
   if (enh_violations * 100 > tx * sesEnhThreshRt)
   {
      // Severely Errored Seconds
      cons_good_enh = 0;
      cons_ses_enh += 1;
      if (state != unavail_window_enh &&
         (cons_ses_enh == uasEnhCriteriaRt))
      {
         // When window activates, a number of ses become uas.
         uas_enh_rt += uasEnhCriteriaRt;
         state = unavail_window_enh;
      }
   }
   else
   {
      // Errored Seconds Only
      cons_ses_enh = 0;
      cons_good_enh += 1;
      if (state == unavail_window_enh &&
         (cons_good_enh == uasEnhCriteriaRt))
      {
      // When window de-activates, too many uas have been counted.
      uas_enh_rt −= uasEnhCriteriaRt;
      state = 0;
      }
   }
}
else
   {
   // Good frame
   cons_ses_enh = 0;
   cons_good_enh += 1;
   if (state == unavail_window_enh &&
      (cons_good_enh == uasEnhCriteriaRt))
      {
      // When window de-activates, too many uas have been counted.
      uas_enh_rt −= uasEnhCriteriaRt;
      state = 0;
      }
   }
}
```

At the end of the reporting interval, the uas_enh_rt value gets reported to the TRAM as part of the statistics reporting by statistics and reporting thread 942. The results can be graphed and analyzed, and when problem patterns are detected, alarms can be triggered for the network operator so they can take corrective actions, listed supra.

The fifteen disclosed new service-level KPIs, described supra, can significantly enhance the service assurance provided to the network-under-test.

Computer System

Figure 10:
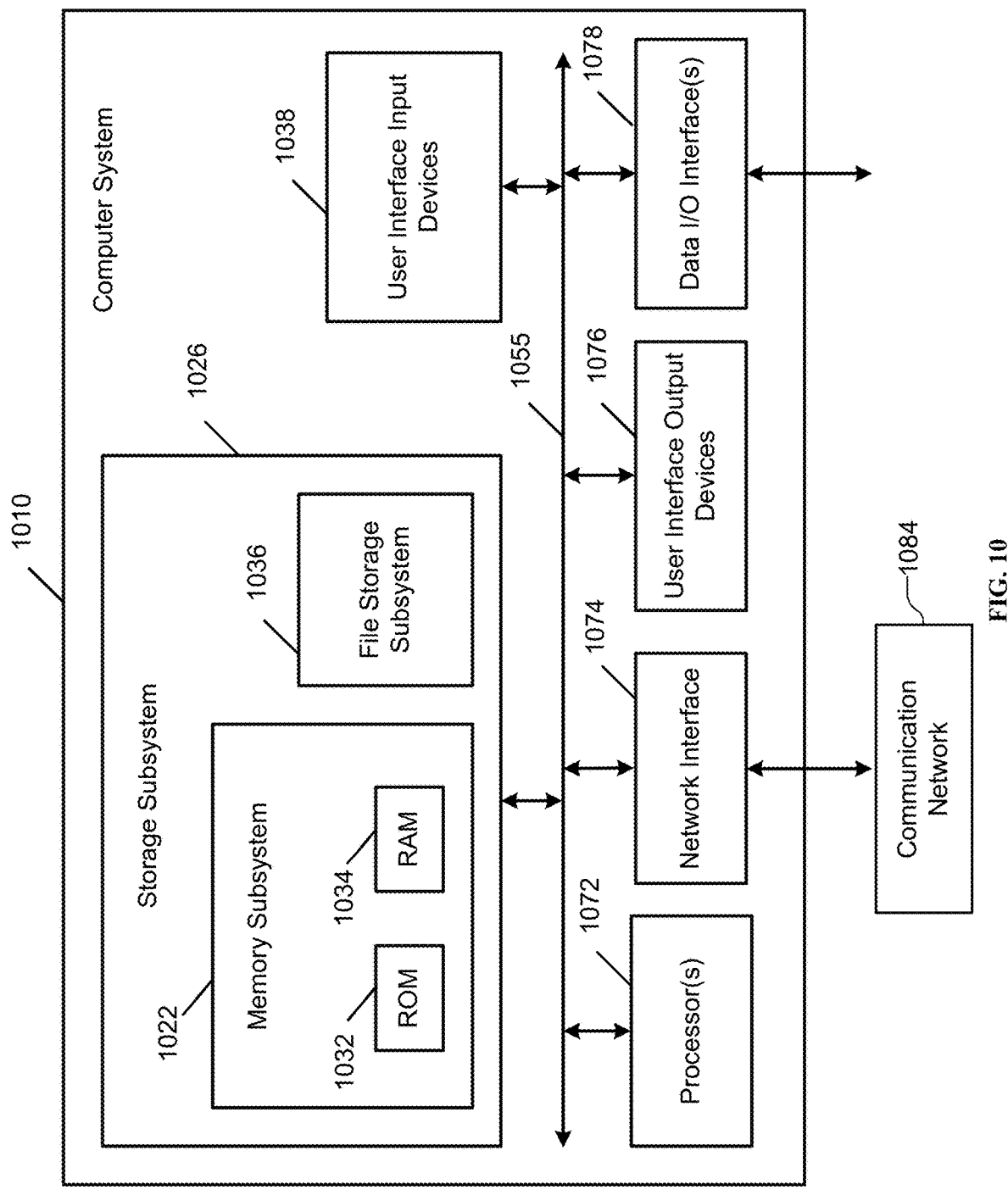
FIG. 10 depicts a block diagram of an exemplary system for tracking and correcting problems for a network-under-test using newly disclosed key performance indicators (KPI), and thereby improving scalability and fault tolerance for TWAMP with a large number of test sessions, according to one implementation of the technology disclosed.

FIG. 10 is a simplified block diagram of a computer system 1000 that can be used for tracking and correcting problems for a network-under-test using newly disclosed key performance indicators (KPI), and thereby improving scalability and fault tolerance for TWAMP with a large number of test sessions, according to one implementation of the technology disclosed.

Computer system 1000 includes at least one central processing unit (CPU) 1072 that communicates with a number of peripheral devices via bus subsystem 1055. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, the network hosts of FIG. 1 can be communicably linked to the storage subsystem 1010 and the user interface input devices 1038. User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. These software modules are generally executed by deep learning processors 1078.

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of launching and updating a measurement architecture using Two-Way Active Measurement Protocol (abbreviated TWAMP) for testing a mesh network includes causing a control-client running on a first network host to receive and parse a configuration file to populate an in-memory data store with destination IP addresses, TCP and UDP transport ports, IP quality of service (abbreviated QoS) parameters, and test session parameters for key performance indicators (abbreviated KPI) used to originate a test including a set of two-way (abbreviated TW) test sessions originating from the first network host; and to originate test sessions with control-servers and session-reflectors using the test session parameters that specify the KPIs. The disclosed method also includes extending the causing to dozens to thousands of control-clients running on additional network hosts by sending to the control-clients, configuration files that cause the control-clients to originate respective test sessions with control-servers in a mesh network using respective test session parameters. The method also optionally includes, while the test is running, sending an updated configuration file to at least one control-client that introduces a new control-server or replaces a control-server; and causing the control-client to expand the test to include the new or replacement control-server without stopping or restarting TW test sessions with other control-servers; and monitoring the running test and receiving reports of results from the network hosts.

This method and other implementations of the technology disclosed can include one or more of the following features and/or features described in connection with additional methods disclosed. In the interest of conciseness, the combinations of features disclosed in this application are not individually enumerated and are not repeated with each base set of features.

In some implementations of the disclosed method, the test session parameters for KPIs include latency thresholds for counting packets that have measured travel time that exceeds the thresholds, including a round trip threshold, a session-sender to session-reflector threshold and a session-reflector to session-sender threshold; and further include receiving from the network hosts counts of the packets that have measured travel time that exceeds the thresholds.

For some implementation of the disclosed method, the test session parameters for KPIs include jitter thresholds for measuring a number of test packets that have measured jitter that exceeds the thresholds, including a round trip threshold, a session-sender to session-reflector threshold and a session-reflector to session-sender threshold; and further include receiving from the network hosts counts of the packets that have measured jitter that exceeds the thresholds.

In some implementations, the test session parameters for KPIs include latency thresholds for counting packets that have measured travel time that exceeds the thresholds, including a round trip threshold, a session-sender to session-reflector threshold and a session-reflector to session-sender threshold; and jitter thresholds for measuring a number of test packets that have measured jitter that exceeds the thresholds, including a round trip threshold, a session-sender to session-reflector threshold and a session-reflector to session-sender threshold; and further include receiving from the network hosts counts of the packets that have both measured travel time that exceeds one of the latency thresholds and measured jitter that exceeds one of the jitter thresholds.

In one implementation, the test session parameters for KPIs include a session loss threshold for a percentage of TW test packets sent by a session-sender that are not reflected back by a session-reflector and received by the session-sender in a predetermined time interval; and further include receiving from the network hosts accumulated time for predetermined time intervals during which packet loss was below the session loss threshold or during which packet loss was above the session loss threshold or both. Another implementation of the disclosed method includes two session loss thresholds for loss and severe loss, wherein the severe loss threshold is greater than the loss threshold; and receiving from the network hosts accumulated time for both session loss thresholds.

In one implementation of the disclosed method, disclosed session parameters for KPIs include unavailable seconds due to packet loss in a test-frame-loss window, wherein the test-frame-loss window starts with consecutive seconds of severe packet loss and ends after consecutive seconds without severe packet loss; and enhanced unavailable seconds due to severe packet loss in the test-frame-loss window, wherein determination of severe packet loss includes lost packets, packets with measured travel time that exceeds a round trip latency threshold, and packets with measured jitter that exceeds a round trip jitter threshold.

In some implementations of the disclosed method, the configuration files sent to the dozens to thousands of control-clients go to subgroups of control-clients with differing respective test parameters for respective subgroups.

One implementation of the disclosed method further includes the network host relaying test session reports of the test sessions to a test results analysis module (abbreviated TRAM).

One implementation of the disclosed method further includes causing a particular control-client to evaluate results of the test sessions conducted by a particular session-sender co-located on a particular network host with the particular control-client; detect a continuing lack of response by a certain session-reflector in a particular test session, indicated by a lack of replies from the certain session-reflector; stop the particular test session between the particular session-sender and the certain session-reflector; responsive to the continuing lack of response; and originate replacement test sessions, with retries as necessary, between the particular session-sender and the certain session-reflector associated with a certain control-server. The disclosed method further includes causing the particular control-client to retry running a control setup to the certain control-server associated with the certain session-reflector until successful completion of the control setup with the certain control-server.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage medium loaded with computer program instructions that, when executed on a processor, implement the disclosed methods described supra.

In one implementation, a disclosed method of enhancing scalability and fault tolerance by using a measurement architecture of Two-Way Active Measurement Protocol (abbreviated TWAMP) for testing a mesh network includes causing a control-client running on a first network host, to initialize an in-memory data store of test session parameters used to originate a test including a set of two-way (abbreviated TW) test sessions originating from the first network host; to parse a configuration file to populate the in-memory data store with destination IP addresses, TCP and UDP transport ports and IP quality of service (abbreviated QoS) parameters for control-servers and session-reflectors; and to originate test sessions with the control-servers and session-reflectors using the test session parameters. The disclosed method also includes extending the causing to initializing the in-memory data store, parsing the configuration file, and originating test sessions to dozens to thousands of control-clients, each originating respective test sessions with control-servers in a mesh network using respective test session parameters. Optionally, while the test is running, the disclosed method includes sending an updated configuration file to at least one control-client that introduces a new control-server or replaces a control-server; causing the control-client to parse the updated configuration file and update the in-memory data structure to include the new control-server destination IP address, TCP and UDP transport port numbers and IP QoS parameters; and causing the control-client to expand the test to include the new control-server. The disclosed method also includes monitoring the running test sessions with the control-servers for reports of results.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some implementations of the disclosed method further include causing the control-client to initialize a server hash table data store and populate the server hash table data store with an index entry to test session parameters stored in memory for each of the control-servers and session-reflectors; extending the causing, to initialize and populate the server hash table data store, to dozens to thousands of control-clients, each originating respective test sessions with control-servers running on additional network hosts in a mesh network using respective test session parameters; and while the test is running, causing the control-client to generate an index entry into the server hash table data store for the new control-server; and causing the control-client to determine, using the generated index entry, whether the new or replaced control-server is represented in the server hash table data store, and if not represented, updating the server hash table data store by adding an index entry representing the new or replaced control-server. The ability to add control-servers without needing to stop and restart ongoing tests contributes to scalability for performance measurement of telecommunication transport networks with a large number of test sessions. The ability to replace control-servers that have failed or that need maintenance, without needing to stop and restart ongoing tests, contributes to fault tolerance for performance measurement of telecommunication transport networks with a large number of test sessions. In one implementation of the disclosed method, the index entry for the server hash table data store includes a 4-byte IPv4 address and a 2-byte UDP port for the control-server. In another implementation, the index entry for the server hash table data store includes a 16-byte IPv6 address and a 2-byte UDP port number for the control-server.

Some implementations of the disclosed method include populating the in-memory data store with test parameters from the parsed configuration file, including one or more of test frame length, jitter threshold round trip, jitter threshold near, jitter threshold far, latency threshold round trip, latency threshold far, latency threshold near, and session loss threshold round trip. Some implementations include the control-client originating hundreds to thousands of test sessions with control-servers on additional network hosts using the test session parameters.

One implementation of the disclosed method further includes the network host relaying test session reports of the test sessions to a test results analysis module (abbreviated TRAM).

In another implementation, a disclosed system includes one or more processors coupled to memory, the memory impressed with computer instructions, the instructions, when executed on the processors, implement actions of the disclosed method described supra.

In yet another implementation a disclosed tangible non-transitory computer readable storage medium impressed with computer program instructions that, when executed on a processor, implement the disclosed methods described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of launching and updating a measurement architecture that extends a Two-Way Active Measurement Protocol (TWAMP) to a mesh of test sessions on a network including:
    causing a control-client running as part of a test on a first network host
        to receive and parse a configuration file to populate an in-memory data store with destination IP addresses, TCP and UDP transport ports, IP quality of service (abbreviated QoS) parameters, and test session parameters for key performance indicators (abbreviated KPIs) used to originate a test including a plurality of two-way (abbreviated TW) test sessions originating from the first network host; and
        to originate test sessions with control-servers and session-reflectors using the test session parameters that specify the KPIs;

causing dozens to thousands of control-clients running on additional network hosts as part of the test to receive and parse configuration files, wherein the configuration files specify that network hosts running at least one control-client engage in test sessions with multiple network hosts running the control-servers, and wherein the test sessions running concurrently on the network hosts collectively form a mesh of TW test sessions;

while the test is running,
  sending an updated configuration file to at least one control-client that introduces a new control-server or replaces a control-server; and
  causing the control-client to expand the test to include the new or replacement control-server while ongoing TW test sessions with other control-servers in the mesh continue to run and without stopping or restarting the ongoing TW test sessions with the other control-servers; and monitoring the test and receiving reports of results from the network hosts.

2. The method of claim 1,
wherein the test session parameters for KPIs include latency thresholds for counting packets that have measured travel time that exceeds the thresholds, including a round trip threshold, a session-sender to session-reflector threshold and a session-reflector to session-sender threshold; and
further including receiving from the network hosts counts of the packets that have measured travel time that exceeds the thresholds.

3. The method of claim 1,
wherein the test session parameters for KPIs include jitter thresholds for measuring a number of test packets that have measured jitter that exceeds the thresholds, including a round trip threshold, a session-sender to session-reflector threshold and a session-reflector to session-sender threshold; and
further including receiving from the network hosts counts of the packets that have measured jitter that exceeds the thresholds.

4. The method of claim 1,
wherein the test session parameters for KPIs include latency thresholds for counting packets that have measured travel time that exceeds the thresholds, including a round trip threshold, a session-sender to session-reflector threshold and a session-reflector to session-sender threshold;
wherein the test session parameters for KPIs include jitter thresholds for measuring a number of test packets that have measured jitter that exceeds the thresholds, including a round trip threshold, a session-sender to session-reflector threshold and a session-reflector to session-sender threshold; and
further including receiving from the network hosts counts of the packets that have both measured travel time that exceeds one of the latency thresholds and measured jitter that exceeds one of the jitter thresholds.

5. The method of claim 1,
wherein the test session parameters for KPIs include a session loss threshold for a percentage of TW test packets sent by a session-sender that are not reflected back by a session-reflector and received by the session-sender in a predetermined time interval; and
further including receiving from the network hosts accumulated time for predetermined time intervals during which packet loss was below the session loss threshold or during which packet loss was above the session loss threshold or both.

6. The method of claim 5, further including
two session loss thresholds for loss and severe loss, wherein the severe loss threshold is greater than the loss threshold; and
receiving from the network hosts accumulated time for both session loss thresholds.

7. The method of claim 1, wherein the session parameters for KPIs include:
unavailable seconds due to packet loss in a test-frame-loss window, wherein the test-frame-loss window starts with consecutive seconds of severe packet loss and ends after consecutive seconds without severe packet loss; and
enhanced unavailable seconds due to severe packet loss in the test-frame-loss window, wherein severe packet loss includes lost packets, packets with measured travel time that exceeds a round trip latency threshold, and packets with measured jitter that exceeds a round trip jitter threshold.

8. The method of claim 1, wherein the configuration files sent to the dozens to thousands of control-clients go to subgroups of control-clients with differing respective test parameters for respective subgroups.

9. The method of claim 1, further including,
causing a particular control-client to:
  evaluate results of the test sessions conducted by a particular session-sender co-located on a particular network host with the particular control-client;
  detect a continuing lack of response by a certain session-reflector in a particular test session, indicated by a lack of replies from the certain session-reflector;
  stop the particular test session between the particular session-sender and the certain session-reflector; responsive to the continuing lack of response; and
  originate replacement test sessions, with retries as necessary, between the particular session-sender and the certain session-reflector associated with a certain control-server.

10. The method of claim 9, further including,
causing the particular control-client to:
  retry running a control setup to the certain control-server associated with the certain session-reflector until successful completion of the control setup with the certain control-server.

11. A system including one or more processors coupled to memory, the memory loaded with computer instructions that, when executed on the processors, launch and update a measurement architecture that extends a Two-Way Active Measurement Protocol (abbreviated TWAMP) to test a mesh network, the instructions, when executed on the processors, implement actions comprising:
causing a control-client running as part of a test on a first network host
  to receive and parse a configuration file to populate an in-memory data store with destination IP addresses, TCP and UDP transport ports, IP quality of service (abbreviated QoS) parameters, and test session parameters for key performance indicators (abbreviated KPIs) used to originate a test including a plurality of two-way (abbreviated TW) test sessions originating from the first network host; and
  to originate test sessions with control-servers and session-reflectors using the test session parameters that specify the KPIs;

causing dozens to thousands of control-clients running on additional network hosts as part of the test to receive and parse configuration files, wherein the configuration files specify that network hosts running at least one control-client engage in test sessions with multiple network hosts running the control-servers, and wherein the test sessions running concurrently on the network hosts collectively form a mesh of TW test sessions;

while the test is running,
sending an updated configuration file to at least one control-client that introduces a new control-server or replaces a control-server;
causing the control-client to expand the test to include the new or replacement control-server while ongoing TW test sessions with other control-servers in the mesh continue to run and without stopping or restarting the ongoing TW test sessions with the other control-servers; and
monitoring the test and receiving reports of results from the network hosts.

12. The system of claim 11,
wherein the test session parameters for KPIs include latency thresholds for counting packets that have measured travel time that exceeds the thresholds, including a round trip threshold, a session-sender to session-reflector threshold and a session-reflector to session-sender threshold; and
further including receiving from the network hosts counts of the packets that have measured travel time that exceeds the thresholds.

13. The system of claim 11,
wherein the test session parameters for KPIs include jitter thresholds for measuring a number of test packets that have measured jitter that exceeds the thresholds, including a round trip threshold, a session-sender to session-reflector threshold and a session-reflector to session-sender threshold; and
further including receiving from the network hosts counts of the packets that have measured jitter that exceeds the thresholds.

14. The system of claim 11,
wherein the test session parameters for KPIs include latency thresholds for counting packets that have measured travel time that exceeds the thresholds, including a round trip threshold, a session-sender to session-reflector threshold and a session-reflector to session-sender threshold;
wherein the test session parameters for KPIs include jitter thresholds for measuring a number of test packets that have measured jitter that exceeds the thresholds, including a round trip threshold, a session-sender to session-reflector threshold and a session-reflector to session-sender threshold; and
further including receiving from the network hosts counts of the packets that have both measured travel time that exceeds one of the latency thresholds and measured jitter that exceeds one of the jitter thresholds.

15. The system of claim 11, wherein the configuration files sent to the dozens to thousands of control-clients go to subgroups of control-clients with differing respective test parameters for respective subgroups.

16. The system of claim 11,
wherein the test session parameters for KPIs include a session loss threshold for a percentage of TW test packets sent by a session-sender that are not reflected back by a session-reflector and received by the session-sender in a predetermined time interval; and
further including receiving from the network hosts accumulated time for predetermined time intervals during which packet loss was below the session loss threshold or during which packet loss was above the session loss threshold or both.

17. The system of claim 16, further including
two session loss thresholds for loss and severe loss, wherein the severe loss threshold is greater than the loss threshold; and
receiving from the network hosts accumulated time for both session loss thresholds.

18. The system of claim 17, wherein the session parameters for KPIs include:
unavailable seconds due to packet loss in a test-frame-loss window, wherein the test-frame-loss window starts with consecutive seconds of severe packet loss and ends after consecutive seconds without severe packet loss; and
enhanced unavailable seconds due to severe packet loss in the test-frame-loss window, wherein severe packet loss includes lost packets, packets with measured travel time that exceeds a round trip latency threshold, and packets with measured jitter that exceeds a round trip jitter threshold.

19. A tangible non-transitory computer readable storage medium impressed with computer program instructions that, when executed on a processor, cause the processor to implement the actions that extend a Two-Way Active Measurement Protocol (TWAMP) to a mesh of test sessions on a network including:
causing a control-client running as part of a test on a first network host
to receive and parse a configuration file to populate an in-memory data store with destination IP addresses, TCP and UDP transport ports, IP quality of service (abbreviated QoS) parameters, and test session parameters for key performance indicators (abbreviated KPIs) used to originate a test including a plurality of two-way (abbreviated TW) test sessions originating from the first network host; and
to originate test sessions with control-servers and session-reflectors using the test session parameters that specify the KPIs;
causing dozens to thousands of control-clients running on additional network hosts as part of the test to receive and parse configuration files, wherein the configuration files specify that network hosts running at least one control-client engage in test sessions with multiple network hosts running the control-servers, and wherein the test sessions running concurrently on the network hosts collectively form a mesh of TW test sessions;
while the test is running,
sending an updated configuration file to at least one control-client that introduces a new control-server or replaces a control-server; and
causing the control-client to expand the test to include the new or replacement control-server while ongoing TW test sessions with other control-servers in the mesh continue to run and without stopping or restarting the ongoing TW test sessions with the other control-servers; and
monitoring the test and receiving reports of results from the network hosts.

20. The tangible non-transitory computer readable storage medium of claim 19, further impressed with computer program instructions wherein the configuration files sent to the dozens to thousands of control-clients go to subgroups of control-clients with differing respective test parameters for respective subgroups.

21. The tangible non-transitory computer readable storage medium of claim 19, further impressed with computer program instructions that implement:
 causing a particular control-client to:
 evaluate results of the test sessions conducted by a particular session-sender co-located on a particular network host with the particular control-client;
 detect a continuing lack of response by a certain session-reflector in a particular test session, indicated by a lack of replies from the certain session-reflector;
 stop the particular test session between the particular session-sender and the certain session-reflector; responsive to the continuing lack of response; and
 originate replacement test sessions, with retries as necessary, between the particular session-sender and the certain session-reflector associated with a certain control-server.

* * * * *